United States Patent
Heki

(10) Patent No.: US 9,034,223 B2
(45) Date of Patent: May 19, 2015

(54) OPTICAL FILM AND PROCESS FOR PRODUCING THE SAME

(75) Inventor: Katsuhiko Heki, Tokyo (JP)

(73) Assignee: KONICA MINOLTA OPTO, INC., Tokyo (JP)

( * ) Notice: Subject to any disclaimer, the term of this patent is extended or adjusted under 35 U.S.C. 154(b) by 839 days.

(21) Appl. No.: 12/665,345

(22) PCT Filed: Jun. 12, 2008

(86) PCT No.: PCT/JP2008/060754
§ 371 (c)(1),
(2), (4) Date: Dec. 18, 2009

(87) PCT Pub. No.: WO2009/001682
PCT Pub. Date: Dec. 31, 2008

(65) Prior Publication Data
US 2010/0179263 A1    Jul. 15, 2010

(30) Foreign Application Priority Data

Jun. 27, 2007    (JP) ................................ 2007-169398

(51) Int. Cl.
*B29D 11/00*    (2006.01)
*B29C 41/26*    (2006.01)
(Continued)

(52) U.S. Cl.
CPC ......... *B29C 47/8845* (2013.01); *B29C 47/0021* (2013.01); *B29C 47/0057* (2013.01);
(Continued)

(58) Field of Classification Search
USPC ........................... 264/1.1, 1.34, 1.6, 216, 217
IPC .............................. B29D 11/00788; B29C 41/26
See application file for complete search history.

(56) References Cited

U.S. PATENT DOCUMENTS

2007/0145615 A1*  6/2007 Heki ............................ 264/1.34

FOREIGN PATENT DOCUMENTS

| JP | 2001062911 | 3/2001 |
|----|------------|--------|
| JP | 2002240125 | 8/2002 |

(Continued)

OTHER PUBLICATIONS

Chinese Office Action Application No. 2008800218288 (4 pages).
(Continued)

*Primary Examiner* — Mathieu D. Vargot
(74) *Attorney, Agent, or Firm* — Lucas & Mercanti, LLP

(57) ABSTRACT

An optical film of high planarity that even in the use of an optical film material containing a non-resinous additive in an amount of 5 mass % or more, would exhibit inexpensive satisfactory roll cleaning effects, and that would find application in, especially, various functional films such as a retardation film and a protective film for polarization plate for use in a liquid crystal display apparatus, etc.; and a process for producing the optical film. There is disclosed a process for producing an optical film according to a melting casting film forming method, including extruding a melt of resin blend containing a resin and 5 mass % or more of non-resinous additive through a casting die into a film form, wherein a first roller (5) for cooling has a temperature of the melting point of the additive to the glass transition temperature (Tg) of the resin blend. Preferably, the first roller (5) for cooling has a peripheral speed (S1) exhibiting a ratio between the same and the peripheral speed (S3) of a third roller (7) for cooling, S3/S1, of 1.001 to 1.05. Preferably, a filmlike molten blend is pressed against the first roller (5) for cooling at a linear pressure of 0.5 to 50 N/mm by means of a second roller (6) for pressure application.

4 Claims, 3 Drawing Sheets

(51) Int. Cl.
*B29C 47/88* (2006.01)
*B29C 47/92* (2006.01)
*B29C 47/00* (2006.01)
*B29C 47/34* (2006.01)
*B29K 105/00* (2006.01)
*B29L 11/00* (2006.01)
*B29L 31/34* (2006.01)

(52) U.S. Cl.
CPC ............... *B29C 47/34* (2013.01); *B29C 47/886* (2013.01); *B29C 47/92* (2013.01); *B29C 2947/92704* (2013.01); *B29C 2947/92923* (2013.01); *B29K 2105/0005* (2013.01); *B29K 2105/256* (2013.01); *B29K 2995/0018* (2013.01); *B29K 2995/0072* (2013.01); *B29L 2011/00* (2013.01); *B29L 2031/3475* (2013.01)

(56) References Cited

FOREIGN PATENT DOCUMENTS

| | | |
|---|---|---|
| JP | 2003089142 | 3/2003 |
| JP | 2007-098917 | 4/2007 |

OTHER PUBLICATIONS

English language translation of Chinese Office Action Application No. 2008800218288 (5 pages).

\* cited by examiner

OPTICAL FILM AND PROCESS FOR PRODUCING THE SAME

CROSS REFERENCE TO RELATED APPLICATIONS

This is a U.S. National Phase Application under 35 U.S.C. 371 of International Application PCT/JP2008/060754, filed on Jun. 12, 2008 which claims the priority of Japanese Patent Application No.: 2007-169398 filed Jun. 27, 2007, the entire contents of both Applications are hereby incorporated by reference.

TECHNICAL FIELD

The present invention relates to an optical film with a high flatness that is produced by a melt casting film forming method, and, in particular, relates to an optical film capable of being utilized for a polarizing plate protection film, a retardation film and a view angle expanding film for use in a liquid crystal display device, further for various kinds of functional film such as an antireflection film for use in a plasma display, as well as for various kinds of functional film for use in an organic EL display and the like. Further, the present invention relates to a method of manufacturing these films.

BACKGROUND ART

In a liquid crystal display, various kinds of optical films, such as a polarization film and a retardation film, are used. In a polarization film of a polarizing plate for use in a liquid crystal display, a cellulose ester film is laminated as a protection film on one side or both sides of a polarizer composed of a stretched polyvinyl alcohol film. A retardation film is used for the purposes, such as expansion of a view angle and improvement in contrast, and the retardation film is produced by stretching films, such as polycarbonate, cyclic polyolefin resin and cellulose ester, so as to provide retardation. The retardation film may also be called an optical compensation film.

In a plasma display and an organic EL display, various kinds of functional films, such as an antireflection film and a protection film are also used.

The optical films used for these display devices are required to satisfy the following points that there is no optical defect, retardation is uniform, and, especially, there is no dispersion in a phase axis. In particular, since a monitor or a TV become larger and higher definition, the above requirements for qualities becomes more severe.

The producing method of an optical film is roughly divided into a melt casting film producing method and a solution casting film producing method. In the former, a film is produced in such a way that polymer is heated and melted to form a molten material (melt), the melt is cast on a support, cooled and solidified to form a film, and the film is stretched, if needed. In the latter, a film is produced in such a way that polymer is dissolved in a solvent to form a solution (dope), the solution is cast on a support to form a film while evaporating the solvent, and the film is stretched, if needed.

In any one of the film producing methods, polymer is solidified on a support to form a polymer film and the polymer film is separated from the support. Thereafter, the polymer film is subjected to processes of drying, stretching and the like while being conveyed by the use of a plurality of conveying rollers.

As compared with a solution casting film producing method which uses a solvent in large quantity, since a melt casting film forming method does not use a solvent, it can expect to increase productivity. Therefore, the melt casting film producing method is more desirable from the above-mentioned viewpoints. However, the melt casting film producing method has the following drawbacks. Resin, additives, etc., which have decomposed thermally at the time of the film production, adhere to conveying rollers to cause the pollution of rollers. If the pollution advances, the pollution is transferred onto a film to cause spotty unevenness and concavo-convex on the film. As a result, the quality of a film becomes deteriorated. Further, when rollers become dirty, a film production is obliged to be interrupted due to the cleaning of the rollers. Therefore, the development of a roller cleaning method in order to keep continuous production has been an important theme.

With regard to the roller cleaning method, Patent Documents 1 to 3 propose the following methods.

In a producing method and apparatus of resin covered (lamination) paper, in particular, in a laminating apparatus including a process of covering with a molten resin, Patent Document 1 discloses a cooling roller cleaning method to remove low molecule components adhering to a cooling roller. As a cleaning method, Patent Document 1 discloses a method of applying energy on the surface of a cooling roller by the use of a high output laser light source or flame of a flame burner.

Patent document 2 discloses a method of removing materials adhering on a roll surface by irradiating ultraviolet rays onto the roll surface used for the production of a film.

In order to reduce flaws on the surface of film generated in a film producing process of a thermoplastic resin film and to clean dirt adhering on a cooling roller, Patent document 3 discloses a method of removing organic substances adhering on a cooling roller by irradiating plasma to the cooling roller which comes in contact with film being conveyed.

Patent Document 1: Japanese Patent Unexamined Publication No. 2002-240125

Patent Document 2: Japanese Patent Unexamined Publication No. 2003-89142

Patent document 3: Japanese Patent Unexamined Publication No. 2001-62911

DISCLOSURE OF THE INVENTION

Problem to be Solved by the Invention

However, in the above-mentioned Patent Documents 1-3, there is a problem that a plant cost and an operation cost become high. Further, in the case of an optical film containing 5% by weight or more of additive agent other than resin, there is another problem that a sufficient effect cannot be obtained unless further improvement is applied.

An object of the present invention is to solves the problem of the above-mentioned conventional technology, and to provide an optical film producing method having a sufficient roller cleaning effect with low cost even for materials of an optical film containing 5% by weight or more of additive agent other than resin as well as an optical film which is produced by the above method and has a good flatness and an excellent optical property.

Means for Solving the Problem

Item 1: In order to attain the above-mentioned purpose, the invention is described as an optical film producing method according to a melt casting film producing method in which a molten material of a resin mixture containing resin and 5% by weight or more of additive agent other than the resin is extruded in the form of film from a casting die, thereafter, the film is pressed between a first rotating member for cooling and a second rotating member for pressing, and then, the cooled film is conveyed by a third rotating member for cooling, and the invention is characterized in that the temperature of the first rotating member for cooling is made equal to or less than the glass transition temperature (Tg) of the resin molten material and equal to or more than the melting point of the additive agent.

Item 2: The invention is characterized, in the optical film producing method described in Item 1, such that the ratio (S3/S1) of the peripheral speed (S3) of the third rotating member for cooling to the peripheral speed (S1) of the first rotating member for cooling is 1.001 to 1.05.

Item 3: The invention is characterized, in the optical film producing method described in Items 1 or 2, such that the film-shaped molten mixture is pressed onto the first rotating member for cooling with a line pressure of 0.5 to 50 N/mm by the second rotating member for pressing.

Item 4: The invention 4 is characterized, in the optical film producing method described in any one of Items 1 to 3, such that the resin mixture contains additive agent other the resin in an amount of 5% by weight or more and 20% by weight or less.

Item 5: The invention is characterized, in the optical film producing method described in any one of Items 1 to 4, such that the additive agent is a plasticizer and/or an ultraviolet absorber.

Item 6: The invention is an optical film characterized by being produced by the use of the optical film producing method described in any one of Items 1 to 5

Effect of the Invention

Even for the material of the optical film containing 5% by weight or more of additive agent other than resin, the invention described in Item 1 can provide the effects that there is no pollution on the rotating member by an additive agent etc., the cost of the cleaning of the rotating member becomes very cheap, and it becomes possible to produce efficiently an optical film which has a good flatness and an excellent optical characteristic, If the temperature of the first rotating member for cooling is made more than the glass transition temperature (Tg) of the resin mixture, when the resin mixture is separated from the first rotating member for cooling, separation unevenness occurs. Further, if the temperature of the first rotating member for cooling is made less than the melting point of the additive agent, it is not desirable, because the additive agent having volatilized from the film. is solidified on a rotating member, pollutes the rotating member, is transferred to a film and appears as stains on the film, It is more desirable that the temperature of the first rotating member for cooling is made equal to or less than (the glass transition temperature (Tg) of the resin mixture −5° C.) and equal to or more than (the melting point of the additive agent. +5° C.)

The invention described in Item 2 is made, in the optical film producing method described in Item 1, such that the ratio (S3/S1) of the peripheral speed (S1) of the peripheral speed, (S3) of the third rotating member cooling to the first rotating member for cooling is 1.001 to 1.05. Therefore, the invention described in claim 2 can provide the effects that there is no pollution on the rotating member by an additive agent etc., the cost of the cleaning of the rotating member becomes very cheap, and it becomes possible to produce efficiently an optical film which has a good. flatness and an excellent optical characteristic if the ratio (S3/31) of the peripheral speed of the rotating member is than 1,001, since the adhesiveness between. the rotating member and the film becomes worse, pollution by the additive agent may occur on the rotating member. On the other hand, if the ratio (S3/S1) of the peripheral speed of the rotating member exceeds 1.05, it is not desirable, because the flatness of the film being conveyed currently may be spoiled, stains may take place on the rotating member and the film, or the film may break out The ratio (S3/S1) of the peripheral speed of the rotating member is 1.002 to 1.04 more desirably, and 1.005 to 1.03 most desirably.

The invention described Item 3 is made, in the optical film producing method described in Items 1 or 2, such that the film-shaped molten mixture is pressed onto the first rotating member for cooling with a line pressure of 0.5 to 50 N/mm by the second rotating member for pressing. Therefore, the invention described in Item 3 can provide the effects that the film-shaped molten mixture can be brought sufficiently in close contact with the first rotating member for cooling, it is possible to prevent pollution on the rotating member by an additive agent etc. beforehand, the effect in cleaning the rotating member becomes high, and it becomes possible to produce efficiently an optical film which has a good flatness and an excellent optical characteristic. If the line pressure of the second rotating member for pressing is less than 0.5 N/mm, it is not desirable, because the film is not pressed sufficiently between the first rotating member for cooling and the second rotating member for pressing, and if a portion incapable of being pressed partially takes place, the portion may become the source of pollution. If the line pressure of the second rotating member for pressing exceeds 50 N/mm, it is not desirable, because distortion takes place on the film so as to make the additive agent stand out on the surface of the film, the stand-out additive agent adheres on the rotating member, and the adhered additive agent becomes the source of pollution. In the present invention, the line pressure of the second rotating member for pressing is 0.7 to 40 N/mm preferably, and 1 to 30 N/mm more preferably.

The invention described in Item 4 is made, in the optical film producing method described, in any one of Items 1 to 3, such that the resin mixture contains additive agent other the resin in an amount. of 5% by weight or more and 20% by weight or less. Therefore, the invention described in Item 4 can provide the effects that there is no pollution on the rotating member by an additive agent etc., and it becomes possible to produce efficiently an optical film which has a good flatness and an excellent optical characteristic.

In the present invention, the additive agent is defined as one which is contained in an amount of 0.3% by weight or more in the film. In the present invention, the additive agent is a plasticizer and an ultraviolet absorber, for example.

The optical film according to the present invention is produced by the optical film producing method described in any one of Items 1 to 5. Therefore, the invention can provide the effects that the optical film has a good flatness and an excellent optical characteristic.

BRIEF DESCRIPTION OF THE DRAWING

FIG. 2 is an principal part expansion flow sheet of a producing apparatus shown in FIG. 1 and is an enlarged view of a part from a casting die to a cooling roller.

EXPLANATION OF REFERENCE SYMBOLS

Figure 1:
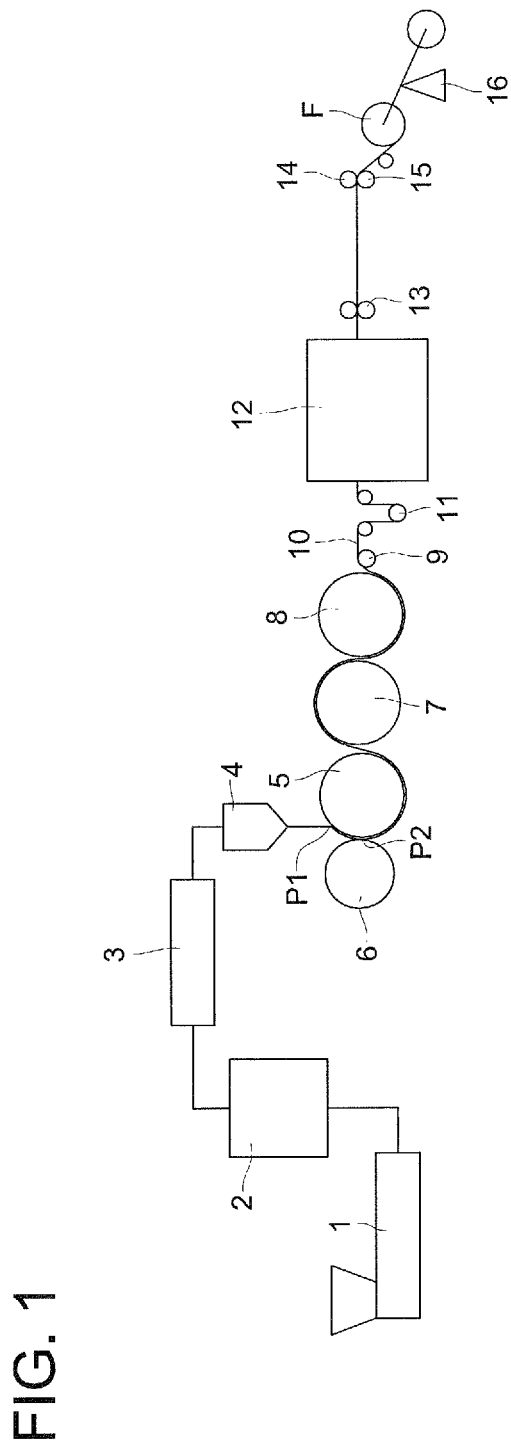
FIG. 1 is an outlined flow sheet showing an embodiment of an apparatus to conduct the producing method of an optical film of the present invention.

1: Extruder
2: Filter
3: Static Mixer
4: Casting Die
5: First Cooling Roller (First Rotating Member for Cooling)
6: Touch Roller (Second Rotating Member for Pressing)
7: Second Cooling Roller (Third Rotating Member for Cooling)
8: Third Cooling Roller (Fourth Rotating Member for Cooling)
P1: Point that the film comes in contact with the first cooling roller surface firstly
P2: Point that the film comes in contact with the touch roller surface
9: Separating Roller
10: Film
11: Dancer Roller (Film Tension Adjusting Roller)
12: Stretching Machine 12
13: Slitting Machine
14: Embossing Ring.
15: Back Roll
16: Winding Up Apparatus
θ1 Angle made between the slow axis or fast axis of a retardation film and a film producing direction
21a: Protection Film
21b: Protection Film
22a: Retardation Film
22b: Retardation Film
23a: Slow Axis Direction of Film
23b: Slow Axis Direction of Film
24a: Transmission Axis Direction of Polarizer
24b: Transmission Axis Direction of Polarizer
25a: Polarizer
25b: Polarizer
26a: Polarizing Plate
26b: Polarizing Plate
27: Liquid Crystal Cell
29: Liquid Crystal Display
F: Optical film (supply roll)

BEST MODE FOR CARRYING OUT THE INVENTION

Hereafter, the best mode for carrying out the present invention will be explained with reference to drawings. However, the present invention is not limited to embodiment in the best mode.

An optical film as an object of the present invention refers to a functional film used in various types of displays such as a liquid crystal display, plasma display and organic electroluminescent display, especially in a liquid crystal display. The optical film includes a polarizing plate protective film, retardation film, antireflection film, brightness enhancing film, and optical compensation film such as view angle enlarging film, especially a retardation film.

In an optical film producing method according to a melt casting film producing method of the present invention, a molten material of a resin mixture containing resin and 5% by weight or more of additive agent other than the resin is extruded in the form of film from a casting die, thereafter, the film is pressed between a first rotating member for cooling and a second rotating member for pressing, and then, the cooled film is conveyed by a third rotating member for cooling.

Further, in the present invention, the temperature of the first rotating member for cooling is made equal to or less than the glass transition temperature (Tg) of the resin molten material and equal to or more than the melting point of the additive agent.

In the optical film producing method of the present invention, it is preferable that the resin mixture contains additive agent other the resin in an amount of 5% by weight or more and 20% by weight or less.

In the present invention, the additive agent is defined that it is contained 0.3% or more in the film by weight ratio. In the present invention, the additive agent is, for example, a plasticizer or an ultraviolet absorber.

In the optical film producing method of the present invention, it is preferable that the film-shaped molten mixture is pressed onto the first rotating member for cooling with a line pressure of 0.5 to 50 N/mm by the second rotating member for pressing. The second rotating member is adapted to mainly act for pressing. However, since the second rotating member comes in contact with the film-shaped molten mixture, it also act for cooling the film-shaped molten mixture.

In the optical film producing method of the present embodiment, the first rotating member for cooling is a cooling roller, the second rotating member for pressing is a touch roller, and the third rotating member for cooling is a conveying and cooling roller.

An optical film of the present invention has preferable requirements, such as easiness in manufacture, good adhesive property to a polarization film, optical transparency, etc., and among them, it is desirable especially that the optical film is a polymer film.

As far as the aforesaid polymer film has the above-described characteristics, the polymer film is no limited specifically, however, examples of the polymer film includes cellulose ester type film such as cellulose diacetate film, cellulose triacetate film, cellulose acetate butyrate film and cellulose acetate propionate film; polyester type film, polycarbonate type film, polyaryrate type film, polysulfon (including polyethersulfon) type film, polyester film such as polyethylene terephthalate and polyethylene naphthalate, polyethylene film, polypropylene film, cellophane, polyvinylidene chloride film, polyvinyl alcohol film, ethylenevinyl alcohol film, syndiotactic polystyrene type film, polycarbonate film, cycloolefin type polymer film (Arton, manufactured by JRS Corp.), Zeonex and Zeonoa (manufactured by Nippon Zeon Corp.), polymethylpentene film, polyether ketone film, polyether ketone imide film, polyamide film, fluorine resin film, nylon film, polymethylmethacrylate film, acryl film and a glass plate. Among them, preferable are cellulose ester type film, cycloolefin polymer film, polycarbonate type film and polysulfon (including polyethersulfon) type film, and in the present invention, specifically preferably utilized are cellulose ester type resin film, and resin film including cycloolefin type addition polymer in an amount of 80% or more, from viewpoints of manufacture, a cost aspect, transparency and an adhesive property.

The materials constituting the optical film of the present invention include these cellulose resins, and if required, a stabilizer, a plasticizer, an ultraviolet absorber, a matting agent as a lubricant and retardation controlling agent. These materials may be selected appropriately in accordance with the requirements of an intended optical film.

(Cellulose Resin)

In the case that cellulose resin is used as material of an optical film of the present invention, the cellulose resin has the structure of a cellulose ester, is a single or mixed acid ester of cellulose (hereafter, merely referred to as "cellulose resin) including the structure of at least any one of an aliphatic acyl group and a substituted or unsubstituted aromatic acyl group, and is amorphous. The term "amorphous" represents the state of a solid substance not becoming any crystal with an irregular molecule arrangement on a crystal state in the form of a raw material.

Hereafter, a cellulose resin preferably used in the embodiment of the present invention will be exemplified. However, the cellulose resin should not be restricted thereto:

In the case that the cellulose resin includes an aromatic acyl group and the aromatic ring is a benzene ring, examples of the substituent of the benzene ring include a halogen atom, cyano, alkyl group, alkoxy group, aryl group, aryloxy group, acyl group, carbonamide group, sulfonamide group, ureido group, aralkyl group, nitro, alkoxy carbonyl group, aryloxy carbonyl group, aralkyloxy carbonyl group, carbamoyl group, sulfamoyl group, acyloxy group, alkenyl group, alkynyl group, alkylsulfonyl group, arylsulfonyl group, alkyloxy sulfonyl group, aryloxy sulfonyl group, alkylsulfonyloxy group and aryloxysulfonyl group.

Further, examples of the substituent of the benzene ring include —S—R, —NH—CO—OR, —PH—R, —P(—R)$_2$, —PH—O—R, —P(—R) (—O—R), —P(—O—R)$_2$, —PH (=O)—R—P(=O) (—R)$_2$, —PH(=O)—O—R, —P(=O) (—R) (—O—R), —P(=O) (—O—R)$_2$, —O—PH(=O)— R, —O—P(=O) (—R)$_2$—O—PH(=O)—O—R, —O—P (=O) (—R) (—O—R), —O—P(=O) (—O—R)$_2$, —NH— PH(=O)—R, —NH—P(=O) (—R) (—O—R), —NH—P (=O) (—O—R)$_2$, —SiH$_2$—R, —SiH(—R)$_2$, —Si(—R)$_3$, —O—SiH$_2$—R, —O—SiH(—R)$_2$ and —O—Si(—R)$_3$.

In the above formulas, R represents an aliphatic group, aromatic group or heterocyclic group.

The number of substituent is 1 through 5, preferably 1 through 4, more preferably 1 through 3, still more preferably 1 or 2. When the number of the substituents to replace the aromatic ring is two or more, they can be the same or different from one another, but they can be combined to form a condensed polycyclic compound (e.g., naphthalene indene, indan, phenanthrene, quinoline, isoquinoline, chromene, chromane, phthalazine, acridine, indole and indoline).

Halogen atom, cyano, alkyl group, alkoxy group, aryl group, aryloxy group, acyl group, carbonamide group, sulfone amide group and ureido group are preferably used as the substituent. Halogen atom, cyano, alkyl group, alkoxy group, aryloxy group, acyl group and carbonamide group are more preferably used. The halogen atom, cyano, alkyl group, alkoxy group and aryloxy group are still more preferably used, and the halogen atom, alkyl group and alkoxy group are most preferably used.

The aforementioned halogen atom includes a fluorine atom, chlorine atom, bromine atom and iodine atom.

The aforementioned alkyl group may be either cyclic or branched. The alkyl group contains preferably 1 through 20 carbon atoms, more preferably 1 through 12, still more preferably 1 through 6, most preferably 1 through 4.

The aforementioned alkyl group is exemplified by methyl, ethyl, propyl, isopropyl, butyl, t-butyl, hexyl, cyclo hexyl, octyl and 2-ethylhexyl.

The aforementioned alkoxy group may be either cyclic or branched. The alkoxy group contains preferably 1 through 20 carbon atoms, more preferably 1 through 12, still more preferably 1 through 6, most preferably 1 through 4. The alkoxy group may be replaced by still another alkoxy group. The alkoxy group is exemplified by methoxy, ethoxy, 2-methoxyethoxy, 2-methoxy-2-ethoxyethoxy, butyloxy, hexyloxy and octyloxy.

The aforementioned aryl group contains preferably 6 through 20 carbon atoms, more preferably 6 through 12. The aryl group is exemplified by phenyl and naphthyl. The aforementioned aryloxy group contains preferably 6 through 20 carbon atoms, more preferably 6 through 12.

The aforementioned aryloxy group is exemplified by phenoxy and naphtoxy. The acyl group contains preferably 1 through 20 carbon atoms, more preferably 1 through 12.

The aforementioned acyl group is exemplified by formyl, acetyl and benzoyl. The aforementioned carbonamide group contains preferably 1 through 20 carbon atoms, more preferably 1 through 12.

The aforementioned carbonamide group is exemplified by acetoamide and benzamide. The aforementioned sulfone amide group contains preferably 1 through 20 carbon atoms, more preferably 1 through 12.

The aforementioned sulfone amide group is exemplified by methane sulfone amide, benzene sulfone amide and p-toluene sulfone amide. The aforementioned ureido group contains preferably 1 through 20 carbon atoms, more preferably 1 through 12.

The aforementioned ureido group is exemplified by (unsubstituted) ureido.

The aforementioned aralkyl group contains preferably 7 through 20 carbon atoms, more preferably 7 through 12. The aralkyl group is exemplified by benzyl, phenethyl and naphthylmethyl.

The aforementioned alkoxy carbonyl group contains preferably 1 through 20 carbon atoms, more preferably 2 through 12. The alkoxy carbonyl group is exemplified by methoxy carbonyl.

The aforementioned aryloxy carbonyl group contains preferably 7 through 20 carbon atoms, more preferably 7 through 12. The aryloxy carbonyl group is exemplified by phenoxy carbonyl.

The aforementioned aralkyloxy carbonyl group contains preferably 8 through 20 carbon atoms, more preferably 8 through 12. The aralkyloxy carbonyl group is exemplified by benzyloxy carbonyl.

The aforementioned carbamoyl group contains preferably 1 through 20 carbon atoms, more preferably 1 through 12. The carbamoyl group is exemplified by (unsubstituted) carbamoyl and N-methylcarbamoyl.

The aforementioned sulfamoyl group contains preferably 20 or less carbons, more preferably 12 or less carbons. The sulfamoyl group is exemplified by (unsubstituted) sulfamoyl and N-methylsulfamoyl. The aforementioned acyloxy group contains preferably 1 through 20 carbon atoms, more preferably 2 through 12.

The aforementioned acyloxy group is exemplified by acetoxy and benzoyloxy.

The aforementioned alkenyl group contains preferably 2 through 20 carbon atoms, more preferably 2 through 12. The alkenyl group is exemplified by vinyl, alyl and isopropenyl.

The aforementioned alkynyl group contains preferably 2 through 20 carbon atoms, more preferably 2 through 12. The alkynyl group is exemplified by thienyl.

The aforementioned alkyl sulfonyl group contains preferably 1 through 20 carbon atoms, more preferably 1 through 12.

The aforementioned aryl sulfonyl group contains preferably 6 through 20 carbon atoms, more preferably 6 through 12.

The aforementioned alkyloxy sulfonyl group contains preferably 1 through 20 carbon atoms, more preferably 1 through 12.

The aforementioned aryloxy sulfonyl group contains preferably 6 through 20 carbon atoms, more preferably 6 through 12.

The aforementioned alkylsulfonyloxy group contains preferably 1 through 20 carbon atoms, more preferably 1 through 12.

The aforementioned aryloxysulfonyl group contains preferably 6 through 20 carbon atoms, more preferably 6 through 12.

In the cellulose resin used in the embodiment of the present invention, when the hydrogen atom of the hydroxyl group of cellulose is a fatty acid ester aliphatic acyl group, the examples include aliphatic acyl group containing 2 through 20 carbon atoms. To put it more specifically, examples are acetyl, propionyl, butyryl, isobutyryl, valeryl, pivaloyl, hexanoyl, octanoyl, lauroyl and stearoyl.

In the embodiment of the present invention, the aforementioned aliphatic acyl group includes the group containing a further substituent. The substituent can be exemplified by those mentioned as substituents of the benzene ring when the aromatic ring is a benzene ring in the aforementioned aromatic acyl group.

When a retardation film is to be manufactured as the optical film, at least one substance selected from among the cellulose acetate, cellulose propyonate, cellulose butylate, cellulose acetate propyonate, cellulose acetate butylate, cellulose acetate phthalate, and cellulose phthalate is preferably used as the cellulose resin.

Of these substances, the particularly preferred cellulose resin is exemplified by cellulose acetate, cellulose propyonate, cellulose butylate, cellulose acetate propyonate and cellulose acetate butylate.

The cellulose acetate propyonate as fatty acid ester and cellulose acetate butylate have an acyl group containing 2 through 4 carbon atoms as a substituent. Assume that the acetyl group has a replacement ratio of X, and the propionyl group or butyryl group has a replacement ratio of Y. In this case, both the following formulae (I) and (II) are preferably met at the same time. The replacement ratio is defined as the numerical value wherein the number of the hydroxyl groups replaced by the acyl group is represented in terms of glucose unit.

$2.5 \leq X+Y \leq 3.0$   Formula (I)

$0 \leq X \leq 2.5$   Formula (II)

$0.3 \leq Y \leq 2.5$   Formula (II)

Particularly the cellulose acetate propyonate is preferably used.

In this case, $0.5 \leq X \leq 2.5$ and $0.5 \leq Y \leq 2.5$ are preferred, More preferably, $1.0 \leq X \leq 2.0$ and $1.0 \leq Y \leq 2.0$.

The portion not replaced by the aforementioned acyl group is normally present as a hydroxyl group. They can be synthesized by a known method.

The cellulose material of the cellulose resin used in the embodiment of the present invention can be a wood pulp or cotton linter. The wood pulp can be a conifer or a broad-leaved tree. The conifer is more preferred. From the viewpoint of separating ability at the time of film formation, use of the cotton linter is more preferred. The cellulose resins produced from these can be used in a mixed form or independently.

In the present invention, it is preferable that the number of luminescent spot foreign particles is minimal.

Luminescent spot foreign particles as described herein refer to the foreign matter particles which are measured when two polarized plates are arranged at a right angle to each other (crossed Nichol state) and a cellulose ester film is placed between them. These foreign matter particles cause leakage of light that is observed at the position at right angles to the outside surface of the other polarizing plate when the retardation axis of the polarizing plate protective film is positioned so as to be parallel to the transmission axis of the polarizing plate at one light source side. The polarizing plate used for this evaluation preferably comprises protective film with no luminescent spot foreign particles and it is preferable that a glass plate is used for protecting the polarizer. It is believed that one cause of luminescent spot foreign particles is the unreacted esterified portion of the hydroxide group included in the cellulose resin. The number of luminescent spot foreign particles can be reduced by using a cellulose resin with few luminescent spot foreign particles or by reducing the number foreign matter particles by filtering the cellulose resin that has been melted by applying heat. Also, the thinner the film, the lesser the number of luminescent spot foreign particles per unit of surface area, and thus there is a tendency for the number of luminescent spot foreign particles to be less as the amount of cellulose resin included in the film is reduced.

The number of luminescent spots having a size in the range 5 to 50 μm of the film observed in a polarized crossed Nichol state is preferably 300 or less per 250 mm$^2$ area while the number of luminescent spots having a size of 50 μm or more is preferably zero. More preferably, the number of 5 to 50 μm luminescent spots is 200 or less.

When the number of luminescent spots is large, there is an adverse effect of the liquid crystal display image. In the case where the retardation film functions as the polarizing plate protection film, the presence of these luminescent spots causes birefringence turbulence and the adverse effect on the image is great.

In the case where the luminescent spot foreign particles are removed by melt filtration, a step for manufacturing the film by melt casting which includes the step of removing the luminescent spots particles is performed continuously.

For the melt casting method which includes a step of filtration of the luminescent spot foreign particles by heat melting, using the plasticizing agent and the cellulose resin described hereinafter as components is preferable when compared to the system in which the plasticizer is not added. This is in view of the fact that the melt temperature is reduced, the removal ratio of the luminescent spot foreign particles is improved and thermal decomposition is avoided. Systems including suitably blended additives described hereinafter such as ultraviolet light absorbers and matting agents may be filtered in the same manner.

Examples of the filter material include those known heretofore such as glass fiber, cellulose fiber, filter paper, and fluorine resins such as tetrafluoroethylene resin, but ceramics and metals are preferably used. Absolute filtration accuracy is preferably 50 μm or less, more preferably 30 μm or less and still more preferably 10 μm or less, and 5 μm or less is even more preferable. The filter materials may be suitably combined and used. The filter material may be the surface type or the depth type, but the depth type is less likely to block up and is thus preferable.

In a separate embodiment, before heat is applied to melt the components of the film, for at least the cellulose resin component, in at least one of the process of latter stage material synthesis and the process of obtaining the precipitate, the luminescent spot foreign particles can be removed in the solution state, via the same filtration process. At this time, it is preferable that a stabilizing agent is present in the cellulose resin, and after plasticizers which are described hereinafter or other additives such as ultraviolet light absorbers and matting agents are dissolved in the solvent, the solid part of the film components with cellulose resin as the main component can be obtained by removing the solvent and drying.

In addition, in order to achieve the solution state described above, the process of dissolving the component materials in a solvent can be done via a step of cooling at $-20°$ C. At the time of adding one of a stabilizer, a plasticizer or other additive to the cellulose resin, there are no particular limits to the cellulose resin synthesis (preparation) step used in this invention. However, filtration may be performed in order to filter out the luminescent spot foreign particle and insoluble substances in the solution state at least up until the latter stage of the resin synthesis (preparation) step, and then the other additives may be added and then the solid components separated by removing the solvent or by acid analysis and then drying done. At the time of pelletizing, the film component materials that have been mixed as a powder can be obtained.

Uniform mixing of the constituent material other than the cellulose resin of the film constituting material with the aforementioned resin effectively provides uniform melting at the time of heating.

Polymer material and oligomer other than the cellulose resin can be selected as appropriate, and can be mixed with the cellulose resin. Such a polymer material and oligomer are preferred to have a high degree of compatibility with the cellulose resin. The transmittance is 80% or more over the entire visible range (400 nm through 800 nm) when a film is formed, preferably 90% or more, more preferably 92% or more. The purpose of mixing at least one of the polymer material and oligomer other than the cellulose resin is to improve the controllability of viscosity at the time of heating and melting, and the physical bodyties of the film subsequent to film processing. The polymer material and oligomer can be interpreted as other additives.

[Cycloolefin Polymer Film]

Cycloolefin polymer film preferably utilized in the present invention will now be explained.

Cycloolefin polymer utilized in the present invention is comprised of polymer resin containing an alicyclic structure.

Preferable cycloolefin polymer is resin in which cycloolefin is polymerized or copolymerized. Cycloolefin includes unsaturated hydrocarbon having a polycyclic structure and derivatives thereof such as norbornene, cyclopentadiene, tetracyclododecene, ethyl tetracyclododecene, ethylidene tetracyclododecene and tetracyclo[7.4.0.110,13.02,7]trideca-2,4,6,11-tetraene; and unsaturated hydrocarbon having a monocyclic structure and derivatives thereof such as cyclobutene, cycloheptene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene, cycloheptene, cyclopentadiene and cyclohexadiene. These cycloolefin may be provided with a polar group as a substituent. A polar group includes a hydroxyl group, a carboxyl group, an alkoxyl group, an epoxy group, a glycidyl group, an oxycarbonyl group, a carbonyl group, an amino group, an ester group and a carbonic acid anhydride group, and specifically preferable is an ester group, a carboxyl group or a carbonic acid anhydride group.

Preferable cycloolefin polymer may be those in which monomer other than cycloolefin being addition copolymerized. Monomer capable of addition copolymerization includes ethylene such as ethylene, propylene, 1-butene and 1-pentene; or dien such as α-olefin-1,4-hexadiene, 4-methyl-1,4-hexadiene, 5-methyl-1,4-hexadiene and 1,7-octadiene.

Cycloolefin is prepared by an addition polymerization reaction or a metathesis open ring polymerization reaction. Polymerization is preformed in the presence of a catalyst. A catalyst for addition polymerization includes, for example, a catalyst comprising a vanadium compound and an organoaluminum compound. A catalyst for open ring polymerization includes a polymerization catalyst comprising a halogenide, nitrate or an acetylacetone compound of metal such as ruthenium, rhodium, palladium, osmium, iridium and platinum, and a reducing agent; or a polymerization catalyst comprising a halogenide or acetylacetone compound of metal such as titanium, vanadium, zirconium, tungsten and molybdenum, and an organoaluminum compound. Such as polymerization temperature and pressure are not specifically limited, however, polymerization is generally performed at a polymerization temperature of $-50$ to $100°$ C. and under a polymerization pressure of 0-490 $N/cm^2$.

Cycloolefin polymer utilized in the present invention is preferably those in which cycloolefin is polymerized or copolymerized followed by being subjected to a hydrogen addition reaction to convert unsaturated bonds in the molecule into saturated bonds. A hydrogen addition reaction is performed by blowing hydrogen in the presence of a hydrogenation catalyst well known in the art. A hydrogenation catalyst includes a homogeneous catalyst comprising a combination of a transition metal compound/an alkyl metal compound such as cobalt acetate/triethyl aluminium, neckel acetylacetonato/triisobutyl aluminum, titanocene dichloride/n-butyl lithium, zirconocene dichloride/sec-butyl lithium and tetrabutoxy titanate/dimethyl magnesium; an inhomogeneous catalyst such as nickel, palladium and platinum; and an inhomogeneous solid carrying catalyst comprising a metal catalyst held by a carrier such as nickel/silica, nickel/diatomaceous earth, nickel/alumina, palladium/carbon, palladium/silica, palladium/diatomaceous earth and palladium/alumina.

In addition, cycloolefin polymer also includes the following norbornene type polymer. Norbornene type polymer is preferably provided with a norbornene skeleton as a repeating unit, and specific examples thereof include those described in such as JP-A Nos. 62-252406, 62-252407, 2-133413, 63-145324, 63-264626 and 1-240517, Examined Japanese Patent Application Publication No. 57-8815, JP-A Nos. 5-39403, 5-43663, 5-43834, 5-70655, 5-279554, 6-200985, 7-62028, 8-176411 and 9-241484, however, is not limited thereto. Further, these may be utilized alone or in combination of at least two types.

Further, as other monomer copolymerizable with norbornene type monomer, utilized are α-olefin having a carbon number of 2-20 such as ethylene, propylene, 1-butene, 1-pentene, 1-hexene, 1-octene, 1-decene, 1-dodecene, 1-tetradecene, 1-hexadecene, 1-octadecene and 1-eicosene, and derivatives thereof; cycloolefin such as cyclobutene, cyclopentene, cyclohexene, cyclooctene and 3a,5,6,7a-tetrahydro-4,7-methano-1H-indene, and derivatives thereof; non-conjugated diene such as 1,4-hexadiene, 4-methyl-1,4-hexadiene, 5-methyl-1,4-hexadiene and 1,7-octadiene. Among them, α-olefin and ethylene are specifically preferable.

These other monomers copolymerizable with norbornene type monomer may be utilized each alone or in combination of at least two types. In the case of addition polymerization of norbornene type monomer and other monomer copolymerizable therewith, a ratio of a structural unit arising from norbornen type monomer and a structural unit arising from copolymerizable other monomer is suitably selected to be in a range of generally 30/70 to 99/1, preferably 50/50 to 97/3 and more preferably 70/30 to 95/5, based on a weight ratio.

when unsaturated bonds remaining in a polymer molecule chain are saturated by a hydrogenation reaction, the hydrogenation degree is preferably set to not less than 90%, preferably not less than 95% and specifically preferably not less than 99%, with respect to light stability and weather-proofing.

In addition, cycloolefin polymer utilized in the present invention includes such as thermoplastic saturated norbornene type resin described in paragraphs [0014] to of JP-A 5-2108, thermoplastic norbornene type resin described in paragraphs [0015] to [0031] of JP-A 2001-277430, thermoplastic norbornene type resin described in paragraphs [0008] to [0045] of JP-A 2003-14901, norbornene type resin compositions described in paragraphs [0014] to [0028] of JP-A 2003-139950, norbornene type resin described in paragraphs [0028] to [0037] of JP-A 2003-161832, norbornene type resin described in paragraphs [0027] to [0036] of JP-A 2003-195268, alicyclic structure containing polymer resin described in paragraphs [0009] to [0023] of JP-A 2003-211588 and norbornen type polymer resin or vinyl alicyclic hydrocarbon polymer resin described in paragraphs [0008] to [0024] of JP-A 2003-211588.

Specifically, such as Zeonex and Zeonoa, manufactured by Nippon Zeon Co., Ltd.; Arton manufactured by JSR Co., Ltd; Apel (such as APL 8008T, APL 6509T, APL 6013T, APL 5014DP and APL 6015T) manufactured by Mitsui Chemicals Co., Ltd. are preferably utilized.

A molecular weight of cycloolefin polymer utilized in the present invention is appropriately selected according to the application, however, it is preferred to achieve a highly balanced mechanical strength and a mold processing behavior of a molded product, when it is in a range of generally 5,000 to 500,000, preferably 8,000 to 200,000 and more preferably 10,000 to 100,000 based on a weight average molecular weight of converted polyisobutylene or polystyrene, measured by a gel permeation chromatography method.

Cycloolefin polymer film may be incorporated with an additive which can be generally blended in plastic film. Such an additive includes such as a thermal stabilizer, a light stabilizer, an ultraviolet absorbent, an antistatic agent, a sliding agent, a plastisizer and a filling agent, and the content can be selected in a range of not disturbing the object of the present invention.

A forming method of cycloolefin polymer film is not specifically limited, and either a heat fused molding method or a solution casting method can be utilized. A heat fused molding method can be classified, in further details, into such as an extrusion molding method, a press molding method, an inflation molding method, an ejection molding method, a blow molding method and a stretching molding method, however, among these methods, to prepare film being excellent in such as mechanical strength and surface precision, preferable are an extrusion molding method, an inflation molding method and a press molding method, and most preferable is an extrusion molding method. The molding condition is appropriately selected depending on an application purpose and a molding method, however, in the case of applying a heat fused molding method, cylinder temperature is appropriately set generally in a range of 150-400° C., preferably of 200-350° C. and more preferably of 230-330° C. There is a possibility of causing molding defects such as a shrink mark or distortion in film due to deteriorated fluidity when the resin temperature is excessively low, while voids or silver streaks or yellowing of film may be generated when the resin temperature is excessively high. Thickness of film is generally in a range of 5-300 µm, preferably of 10 to 200 µm and more preferably of 20 to 100 p.m. Handling at accumulation becomes difficult when the thickness is excessively thin, while drying time after accumulation becomes long to deteriorate productivity when the thickness is excessively thick.

Cycloolefin polymer film is preferably has a wetting tension of the surface of preferably not less than 40 mN/m, more preferably not less than 50 mN/m and furthermore preferably not less than 55 mN/m. When the wetting tension of the surface is in the above-described range, adhesion strength between the film and polarizer film will be increased. To adjust the wetting tension of the surface, for example, it is possible to apply film with a corona discharge treatment, ozone blowing, ultraviolet ray irradiation, a flame treatment, a chemical treatment and other surface treatments well known in the art.

Thickness of a sheet before stretching is required to be approximately 50-500 µm; and thickness unevenness is preferably as small as possible and is within ±8%, preferably within ±6% and more preferably within ±4%, in the whole surface.

To make the cycloolefin polymer film described above to an optical film of the present invention, it is possible to prepare by a manufacturing method similar to the aforesaid cellulose ester film, and it is possible to prepare it at least by uniaxially stretching a sheet. Here, "uniaxially stretching" may be "substantially uniaxially stretching" corresponding to biaxially stretching, that is, for example, a sheet is stretched within a range in which the orientation of molecules is not influenced, and then the sheet is further uniaxially stretched such that molecules are oriented to a predetermined direction. It may be preferable to use a tentar device and the like for the stretching.

Thus obtained film is comprised of molecules being oriented by stretching to be provided with a desired amount of retardation. In the present invention, retardation in the plane Ro at 589 nm is preferably 30 to 100 nm and more preferably 40 to 70 nm. Further, retardation in the thickness direction Rt is 70 to 300 nm, and preferably 100 to 250 nm Retardation can be controlled by: a retardation of a sheet before stretching, a stretching ratio, a stretching temperature and a thickness of the film oriented by stretching. When a sheet before stretching has a constant thickness, since there is a tendency that an absolute value of retardation is increased as the stretching ratio of film is large, stretching oriented film having a desired retardation can be obtained by adjusting the stretching ratio.

The smaller is scattering of retardation, the more preferable, and cycloolefin film of the present invention has a scattering of retardation at a wavelength of 589 nm as small as generally within ±50 nm, preferably within ±30 nm and more preferably within ±20 nm.

Variation of in-plane retardation or retardation in the thickness direction, or unevenness in thickness can be minimized by the use of a sheet having a smaller retardation variation or a smaller thickness variation before stretching and by a technique to make stress to be uniformly applied to the sheet when the sheet is stretched. For this purpose, the sheet is preferably stretched under a uniform temperature distribution, that is, in an environment of controlled temperature of within ±5° C., preferably within ±2° C. and specifically preferably within ±0.5° C.

(Polycarbonate Type Film)

There are various polycarbonate type resins utilized to prepare polycarbonate type film; aromatic polycarbonate is preferable with respect to chemical properties and physical properties and specifically preferable is bisphenol A type polycarbonate. Among them, furthermore preferable resin includes those utilizing a bisphenol derivative, in which such as a benzene ring, a cyclohexane ring or an aliphatic hydrocarbon group is introduced in bisphenol A, however, specifically preferable is polycarbonate, which is prepared by utilizing a derivative introduced with these groups asymmetrically against the central carbon, having a structure with reduced anisotropy in a unit molecule. For example, preferable is polycarbonate prepared by utilizing bisphenol A in which tow methyl groups of the central carbon are substituted by benzene rings, or bisphenol A in which one hydrogen of each benzene ring is substituted by a methyl group or a phenyl group, asymmetrically against the central carbon.

Specifically, preferable resin is those prepared from 4,4'-dihydroxydiphenylalkane or a halogen substitutent thereof by a phosgene method or an ester exchange method, and includes such as 4,4'-dihydroxydiphenylmethane, 4,4'-dihydroxydiphenylethane and 4,4'-dihydroxydiphenylbutane.

In the retardation film comprising polycarbonate resin utilized in the present invention, transparent resin such as polystyrene type resin, methylmethacrylate type resin or cellulose acetate type resin may be utilized in combination by mixing, or polycarbonate resin may be accumulated on at least one surface of cellulose acetate type film.

Preparation method of polycarbonate type film utilizable in the present invention is not specifically limited, and any one of film by an extrusion method, film by a solvent casting method and film by a calendar method may be utilized. In the present invention, a polycarbonate film can be obtained by the same manufacturing method as the preferable manufacturing method for the cellulose ester film and by employing a uniaxial stretching method or a biaxial stretching method.

Polycarbonate type film utilized in the present invention is preferably has a glass transition temperature (Tg) of not lower than 110° C. and a water absorbability (a value measured under a condition in water of 23° C. for 24 hours) of not more than 0,3%. More preferable is to utilize those having a Tg of not lower than 120° C. and a water absorbability of not more than 0.2%.

At least one of the stabilizers should be added to the film constituting material before or at the time of heating and melting of the aforementioned cellulose resin. The stabilizer is required to function without being decomposed at the melting temperature for film formation.

The stabilizer includes a hindered phenol antioxidant, acid-acceptor, hindered amine light stabilizer, peroxide decomposer, radical acceptor, metal deactivator and amines. They are disclosed in the Japanese Non-Examined Patent Application Publication (Tokkaihei) 3-199201, Japanese Non-Examined Patent Application Publication (Tokkaihei) 5-1907073, Japanese Non-Examined Patent Application Publication (Tokkaihei) 5-194789, Japanese Non-Examined Patent Application Publication (Tokkaihei) 5-271471, and Japanese Non-Examined Patent Application Publication (Tokkaihei) 6-107854.

The stabilizer is used to prevent oxidation of the film constituting material, to capture the acid produced by decomposition, to prevent or inhibit decomposition caused by radical species due to light or heat, and to check generation of volatile component caused by the degeneration represented by coloring or a reduction in molecular weight or material decomposition, including the decomposition reaction yet to be clarified. To be more specific, addition of stabilizer into the film constituting material is very effective in checking or preventing generation of the volatile component resulting from degeneration and decomposition of the film constituting material other than the stabilizer. Further, the stabilizer itself is required not to generate a volatile component in the range of temperature for melting the film constituting material.

In the meantime, if the film constituting material is heated and melted, the degree of decomposition is increased. This composition may reduce the strength of the aforementioned constituting material resulting from coloring or reduction in the molecular weight. Further, the decomposition of the film constituting material may be accompanied by production of volatile components.

In the film constituting material, in order to avoid deterioration of material and to reduce moisture absorbency, the constituent materials can be made into one or more kinds of pellets and stored in the form of pellets. The formation of pellets can improve the mixing ability and compatibility of molten material at the time of heating, and secure an optical uniformity of an obtained film.

At the time of heating and melting the film constituting material, the presence of a stabilizer is preferred, because the stabilizer minimizes the reduction in strength caused by deterioration and decomposition of the material, or maintains the strength intrinsic to the material.

When the retardation film is manufactured, addition of a stabilizer is preferable. In the process of providing retardation as a retardation film in the production of a film, the stabilizer minimizes reduction in the deterioration of the strength of the aforementioned film constituting material, or maintains the strength inherent to the material. If the film constituting material becomes brittle by considerable deterioration, breakage tends to occur in the step of orientation at the time of film formation. This is because retardation value as a retardation film cannot be ensured in some cases.

Further, the presence of the stabilizer is important because it reduces generation of a colored object in the visible light area at the time of heating and melting, and reduces or removes the factors undesirable to the retardation film such as transmittance or haze value caused by entry of the volatile component into the film. The haze value is less than 1%, preferably less than 0.5%.

In the film constituting material storage or film making process, deterioration may be caused by the presence of oxygen in the air. In this case, means can be provided to reduce the density of oxygen in the air, in addition to the method of using the stabilizing function of the stabilizer. Such means can be exemplified by the known technology of using the nitrogen or argon as an inert gas, deaeration under reduced pressure or under vacuum, and operation in an enclosed environment. At least one of these three methods can be used together with the method wherein the aforementioned stabilizer is present. When the probability of the film constituting material contacting the oxygen in the air is reduced, deterioration of the aforementioned material can be reduced.

When the retardation film is used as a polarizing plate protective film, the aforementioned stabilizer should be incorporated in the film constituting material in order to improve the chronological keeping quality with respect to the polarizer constituting the polarizing plate and polarizing plate.

In the liquid crystal display apparatus using a polarizing plate, presence of the aforementioned stabilizer in the retardation film improves the chronological keeping quality of the retardation film and provides the optical compensation function for a long period of time.

A known compound can be used as a hindered phenol antioxidant compound useful for stabilization at the time of heating and melting a film constituting material, and is exemplified by a 2,6-dialkyl phenol derivative compound, such as a compound disclosed in the 12th through 14th columns in the specification of the U.S. Pat. No. 4,839,405. Examples of these compounds include a compound represented by the following formula.

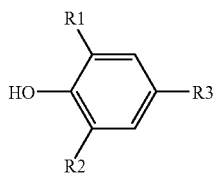

Formula 1

In the above formula, R1, R2 and R3 are each a substituted or unsubstituted alkyl group. Concrete examples of the hindered phenol compound include n-octadecyl 3-(3,5-di-t-butyl-4-hydroxyphenyl)propionate, n-octadecyl 3-(3,5-di t-butyl-4-hydroxyphenyl)acetate, n-octadecyl 3,5-di t-butyl-4-hydroxybenzoate, n-hexyl 3,5-di-t-butyl-4-hydroxyphenylbenzoate, n-dodecyl 3,5-di-t-butyl-4-hydroxyphenylbenzoate, neododecyl 3-(dodecyl β-(3,5-di-t-butyl-4-hydroxyphenyl)propionate, ethyl α-(4-hydroxy-3,5-di-t-butylphenyl)isobutylate, octadecyl α-(4-hydroxy-3,5-di-t-butylphenyl)isobutylate, octadecyl α-(4-hydroxy-3,5-di-t-butyl-4-hydroxyphenyl)propionate, 2-(n-octyl)ethyl 3,5-di-t-butyl-e-hydroxybenzoate, 2-(n-octyl)ethyl 3,5-di-t-butyl-4-hydroxyphenylacetate, 2-(n-octadecylthio)ethyl 3,5-di-t-butyl-4-hydroxyphenyl-acetate, 2-(n-octadecylthio) ethyl 3,5-di-t-butyl-4-hydroxybenzoate, 2-(2-hydroxyethylthio)ethyl 3,5-di-t-butyl-4-hydroxybenzoate, diethylglycyl bis-(3,5-di-t-butyl-4-hydroxyphenyl)propionate, 2-(n-octadecylthio)ethyl 3-(3,5-di-t-butyl-4-hydroxyphenyl)propionate, stearylamido N,N-bis[ethylene 3-(3,5-di-t-butyl-4-hydroxyphenyl)-propionate], n-butylimino N,N-bis-[ethylene 3-(3,5-di-t-butyl-4-hydroxyphenyl)propionate], 2-(2-stearoylo-xyethylthio)ethyl 3,5-di-t-butyl-4-hydroxybenzoate, 2-(2-stearoylo-xyethylthio)ethyl 7-(3-methyl-5-t-butyl-4-hydroxyphenyl)heptanoate, 1,2-propylene glycol bis-[3-(3,5-di-t-butyl-4-hydroxyphenyl)propionate], ethylene glycol bis-[3-(3,5-di-t-butyl-4-hydroxyphenyl)-propionate], neopentyl glycol bis-[3-(3,5-di-t-butyl-4-hydroxyphenyl)propionate], ethylene glycol bis-(3,5-di-t-butyl-4-hydroxyphenylacetate), glycerol 1-n-octadecanoate-2,3-bis-(3,5-di-t-butyl-4-hydroxyphenylacetate), pentaerythrytol tetrakis[3-(3,5-di-t-butyl-4'-hydroxyphenyl) propionate], 1,1,1-trimethylolethane tris[3-(3,5-di-t-butyl-hydroxyphenyl)propionate], sorbitol hexa-[3-(3,5-di-t-butyl-hydroxyphenyl)propionate], 2-hydroxyethyl 7-(3,5-di-t-butyl-hydroxyphenyl)propionate, 2-stearoyloxyethyl 7-(3,5-di-t-butyl-hydroxyphenyl)-heptanoate, 1,6-n-hexanediol bis-[(3,5-di-t-butyl-4-hydroxyphenyl)propionate] and pentaerythrytol tetrakis(3,5-di-t-butyl-4-hydroxycinnamate).

The above-described type hindered phenol antioxidant is, for example, available on the market under the commercial name of Irganox 1076 and Irganox 1010 of Ciba Specialty Chemicals.

As an acid acceptor useful for stabilization at the time of heating and melting a film constituting material, a compound including an epoxy compound described in the specification of the U.S. Pat. No. 4,137,201 is preferably used. Such a compound is already known in the aforementioned technical field. It is exemplified by the diglycidyl ether of various polyglycols; polyglycol induced by condensation of about 8 through 40 moles of ethylene oxide per mole of polyglycol in particular; a metallic epoxy compound such as diglycidyl ether of glycerol (e.g. the compound having been used so far together with polyvinyl chloride polymer composition in the polyvinyl chloride polymer composition); epoxidized ether condensed product; diglycidyl ether of the bisphenol A (e.g., 4,4'-dihydroxydiphenyl dimethyl methane); epoxidized unsaturated fatty acid ester (particularly, the alkyl ester containing about 4 through 2 carbon atoms of the fatty acid of this carbon atom having about 2 through 22 (e.g., butyl epoxy stearate); and various epoxidized long chain fatty acid triglyceride (e.g., epoxidized plant oil and other unsaturated natural gas (sometimes called the epoxidized natural glyceride or unsaturated fatty acid wherein these fatty acid generally contain 12 through 22 carbon atoms)) represented and illustrated by the compound of epoxidized soy bean oil). An epoxy group-containing epoxide resin compound available on the market EPON815c, manufacture by Miller-Stephenson Chemical Co., Ltd. and an epoxide ether oligomer condensation product represented by the following formula are particularly preferable.

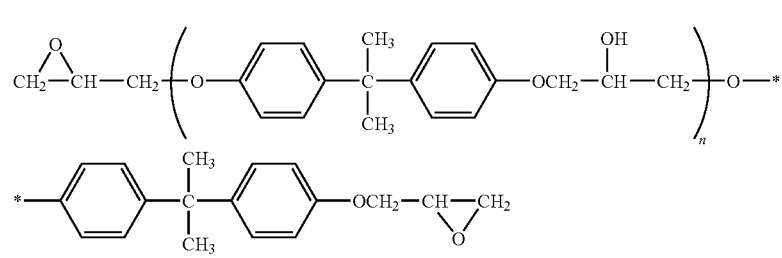

Formula 2

In the above formula, n is an integer of from 0 to 12.

Further employable acid capturing agent includes those described in Tokkai Hei 5-194788, paragraphs 87 to 105.

A known compound can be used as the hindered amine light stabilizer (HALS) contributing to the stabilization at the time of heating and melting of the film constituting material. To put it more specifically, it is exemplified by 2,2,6,6-tetraalkyl piperidine compound, the acid added salt thereof, or the complex between the same and metallic compound, as described in the 5th through 11th columns in the Specification of the U.S. Pat. No. 4,619,956 and in the 3rd through 5th columns in the Specification of the U.S. Pat. No. 4,839,405. Such the compounds include a compound represented by the following formula.

Formula 3

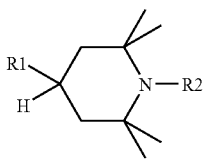

In the above formula, R1 and R2 are each a hydrogen atom or a substituent.

Concrete examples of the hindered amine photo-stabilizer include 4-hydroxy-2,2,6,6-tetramethyl-piperidine, a allyl-4-hydroxy-2,2,6,6-tetramethyl-piperidine, 1-benzyl-4-hydroxy-2,2,6,6-tetramethyl-piperidine, 1-(4-t-butyl-2-butenyl)-4-hydroxy-2,2,6,6-tetramethylpiperidine, 4-stearoyloxy-2,2,6,6-tetramethylpiperidine, 1-ethyl-4-salicyloyloxy-2,2,6,6-tetramethylpiperidine, 4-methacryloyloxy-1,2,2,6,6-pentamethylpiperidine, 1,2,2,6,6-pentamethylpiperidine-4-yl-β(3,5-di-t-butyl-4-hydroxyphenyl)-propionate, 1-benzyl-2,2,6,6-tetramethyl-4-piperidinylamleinate, (di-2,2,6,6-tetramethylpiperidine-4-yl)-adipate, (di-2,2,6,6-tetramethylpiperidine-4-yl)-sebacate, (di-1,2,3,6-tetramethyl-2,6-diethyl-piperidine-4-yl)-sebacate, (di-1-allyl-2,2,6,6-tetramethylpiperidine-4-yl)-phthalate, 1-acetyl-2,2,6,6-tetramethylpiperidine-4-yl)-acetate, trimellitic acid ester of tri-(2,2,6,-tetramethyl-piperidine-4-yl), 1-acryloyl-4-benzyloxy-2,2,6,6-tetramthyl-piperidine, di-(1,2,2,6,6-pentamethyl-piperidine-4-yl) dibutylmalonate, di-(1,2,3,6-tetramethyl-2,6-diethylpiperidine-4-yl) dibenzylmlonate, dimethyl-bis-(2,2,6,6-tetramethylpieridine-4-oxy)-silane, tris-(1-propyl-2,2,6,6-tetramethylpieridine-4-yl) phosphite, tris-(1-propyl-2,2,6,6-tetramethylpieridine-4-yl) phosphate, N,N'-bis-(2,2,6,6-tetramethylpieridine-4-yl)-hexamethylene-1,6-di-acetoamide, 1-acetyl-4-(N-cyclohexylacetamido)-2,2,6,6-tetramethylpieridine, 4-benzylamino-2,2,6,6-tetramethyl-pieridine, N,N'-bis-(2,2,6,6-tetramethyl-pieridine-4-yl)-N,N'-dibutyl-adipamide, N,N'-bis-(2,2,6,6-tetramethylpieridine-4-yl)-N,N'-dicyclohexyl-(2-hydroxypropylene), N,N'-bis-(2,2,6,6-tetramethyl-pieridine-4-yl)-p-xylenediamine, 4-(bis-2-hydroxyethyl)-amino-1,2,2,6,6-pentamethylpiperidine, 4-methacrylamido-1,2,2,6,6-pentamethylpiperidine and methyl α-cyano-β-methyl-β-[N-2,2,6,6-tetramethylpieridine-4-yl]]-amino-acrylate.

Preferable hindered amine photo-stabilizer includes the following HALS-1 and HALS-2.

At least one of the stabilizer types can be selected and added. The amount to be added is preferably 0.001 or more percent by mass without exceeding 5 percent by mass with respect to the mass of cellulose resin, more preferably 0.005 or more percent by mass without exceeding 3 percent by mass, still more preferably 0.01 or more percent by mass without exceeding 0.8 percent by mass.

If the amount of the stabilizer to be added is insufficient, the advantages of the stabilizer cannot be used effectively due to a lower effect of stabilization at the time of heating and melting. If the amount of the stabilizer to be added is excessive on the other hand, film transparency will be reduced for the compatibility with resin, and the film will become brittle. This must be avoided.

The stabilizer is preferably mixed before melting the resin. A mixer may be used for this purpose, or mixing may be made in the cellulose resin preparation phase, as described above. It is also possible to make such arrangements that mixing is made at a temperature of the melting point of the resin or more without exceeding that of the stabilizer, and only the stabilizer is melted and is adsorbed on the surface of resin.

Addition of the plasticizer is preferred for the purpose of improving the film quality such as improving mechanical property, providing softness and water repellency, and reducing the moisture transmittance.

In the melt-casting film formation method practiced in the embodiment of the present invention, use of a plasticizer is intended to reduce the film constituting material melting temperature below than the glass transition temperature of the single cellulose resin to be used, or to reduce the viscosity for melting the film constituting material including the plasticizer below that of the single cellulose resin at the same heating temperature.

The film constituting material melting temperature in the sense in which it is used here in the embodiment of the present invention refers to the temperature at which the material is heated when the aforementioned material is fluidized by heating.

When only the cellulose resin is used singly and the temperature is lower than the glass transition temperature, the material is not fluidized to form a film. In the case of the aforementioned resin, however, the modulus of elasticity or viscosity is reduced by absorption of heat at the glass transition temperature or more, and the material is fluidized. To lower the film constituting material melting temperature, the plasticizer to be added is required have a melting point or a Formula 4

HALS-1)

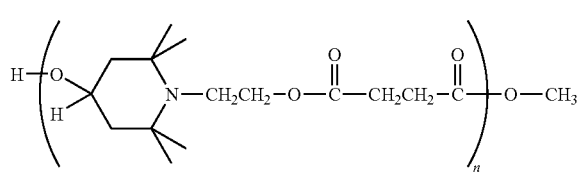

HALS-2)

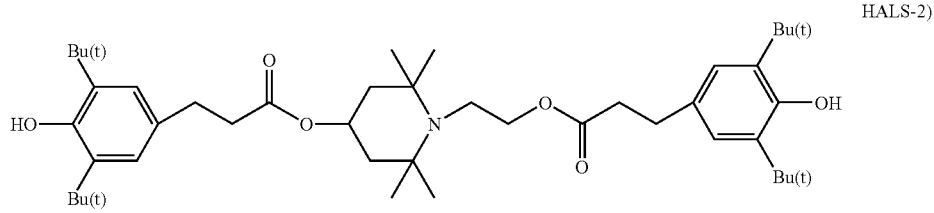

glass transition temperature lower than the glass transition temperature of the cellulose resin. This is preferred to achieve the aforementioned object.

For example, a phosphoric acid ester derivative and carboxylic acid ester derivative are preferably used as a plasticizer. It is also preferred to use the polymer obtained by polymerization of the ethylenic unsaturated monomer having a weight average molecular weight of 500 or more without exceeding 10,000 mentioned in the Japanese Non-Examined Patent Application Publication (Tokkai) 2003-12859, the acryl based polymer, the acryl based polymer having an aromatic ring on the side chain, or acryl based polymer having the cyclohexyl group on the side chain.

The phosphoric acid ester derivative is exemplified by triphenyl phosphate, tricresyl phosphate and phenyldiphenylphosphate.

The carboxylic acid ester derivative is exemplified by phthalic acid ester and citric acid ester. The phthalic acid ester derivative is exemplified by dimethylphthalate, diethylphthalate, dicyclohexyl phthalate, dioctylphthalate and diethylhexylphthalate. The citric acid ester is exemplified by citric acid acetyl triethyl and citric acid acetyl tributyl.

Other substances preferably used for the aforementioned purpose are butyl oleate, methylacetyl ricinoleate, dibutyl sebacate, triacetin, trimethylol propane tribenzoate and others. Alkylphthalylalkylglycolate is also used for this purpose. The alkyl of the alkylphthalyl alkylglycolate is an alkyl group containing 1 through 8 carbon atoms. The alkylphthalyl alkylglycolate is exemplified by methylphthalyl methylglycolate, ethylphthalyl ethylglycolate, propylphthalyl propylglycolate, butylphthalyl butylglycolate, octylphthalyl octylglycolate, methylphthalyl ethylglycolate, ethylphthalylmethyl glycolate, ethylphthalylpropyl glycolate, propylphthalyl ethylglycolate, methylphthalyl propylglycolate, methylphthalyl butylglycolate, ethylphthalylbutyl glycolate, butylphthalyl methylglycolate, butylphthalyl ethylglycolate, propyl phthalyl butylglycolate, butylphthalyl propylglycolate, methylphthalyl octylglycolate, ethylphthalyloctyl glycolate, octylphthalyl methylglycolate and octylphthalyl ethylglycolate. Methylphthalyl methylglycolate, ethylphthalyl ethylglycolate, propylphthalyl propylglycolate, butylphthalyl butylglycolate and octylphthalyl octylglycolate are preferably used. In particular, ethylphthalyl ethylglycolate is preferably used. Further, two or more of the alkylphthalyl alkylglycolate and others can be mixed for use.

The amount of the plasticizer to be added is preferably 0.5 percent by mass or more through less than 20 percent by mass, with respect to the resin constituting the film constituting material, more preferably 1 percent by mass or more through less than 11 percent by mass.

The aforementioned plasticizer is preferred not to generate a volatile component at the time of heating and melting. To put it more specifically, the nonvolatile phosphoric acid ester described in the Japanese Non-Examined Patent Application Publication (Tokuyohei) 6-501040 can be mentioned as an example. The arylene bis(diaryl phosphate) ester and trimethylol propane tribenzoate as the above illustrated compound can be preferably used, without being restricted thereto. When the volatile component is subjected to the thermal decomposition of the plasticizer, the thermal decomposition temperature Td (1.0) of the plasticizer is defined as the temperature at the time of reduction by 1.0 percent by mass. This requires that the temperature is higher than the film constituting material melting temperature (Tm). This is because, in order to meet the purpose of addition, the amount of the plasticizer to be added to the cellulose resin is greater than that of other film constituting material, and the presence of the volatile component has a serious impact on the deterioration of the quality of the film to be obtained. It should be noted that thermal decomposition temperature Td (1.0) can be measured by the commercially available differential thermogravimetric analyzer (TG-DTA).

For the purpose of preventing the polarizer and display apparatus from being deteriorated by ultraviolet rays, the ultraviolet absorber is characterized by excellent function of absorbing the ultraviolet rays having a wavelength of 370 nm or less. Viewed from the liquid crystal display performance, the absorber is preferred to absorb a smaller amount of the visible light with a wavelength of 400 nm or more.

The ultraviolet absorber is exemplified by an oxybenzophenone based compound, benzotriazole based compound, salicylic acid ester based compound, benzophenone based compound, cyanoacrylate based compound and nickel complex salt based compound. The benzophenone based compound and benzotriazole based compound of less coloring are preferably used. It is also possible to use the ultraviolet absorber mentioned in the Japanese Non-Examined Patent Application Publication (Tokkaihei) 10-182621 and Japanese Non-Examined Patent Application Publication (Tokkaihei) 8-337574 and the polymer ultraviolet absorber described in the Japanese Non-Examined Patent Application Publication (Tokkaihei) 6-148430.

The benzotriazole based ultraviolet absorber is exemplified by mixtures of 2-(2'-hydroxy-5'-methylphenyl) benzotriazole, 2-(2',-hydroxy-3',5'-di-tert-butylphenyl) benzotriazole, 2-(2'-hydroxy-3'-tert-butyl-5'-methylphenyl) benzotriazole, 2-(2'-hydroxy-3',5'-di-tert-butylphenyl)-5-chlorobenzotriazole, 2-(2'-hydroxy-3'-(3",4", 5",6H-tetrahydrophthalimide methyl)-5'-methylphenyl) benzotriazole, 2,2-methylene bis(4-(1,1,3,3-tetramethylbutyl)-6-(2H-benzotriazole-2-yl) phenol), 2-(2'-hydroxy-3 1-tert-butyl-5'-methylphenyl)-5-chlorobenzotriazole, 2-(2H-benzotriazole-2-yl)-6-(straight chain and side chain dodecyl)-4-methylphenol, octyl-3-[3-tert-butyl-4-hydroxy-5-(chloro-2H-benzotriazole-2-yl) phenyl]propyonate and 2-ethylhexyl-3-[3-tert-butyl-4-hydroxy-5-(5-chloro-2H-benzotriazole-2-yl) phenyl]propyonate, without being restricted thereto.

TINUVIN 109, TINUVIN 171, TINUVIN 326 (by Ciba Specialty Chemicals K.K.) can be mentioned as a commercially available.

The benzophenone based compound can be exemplified by 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenyl methane), without being restricted thereto.

The amount of the ultraviolet absorber to be added is 0.1 through 20 percent by mass with respect to the mass of cellulose resin, preferably 0.5 through 10 percent by mass, more preferably 1 through 5 percent by mass. Two or more types thereof can be added in combination.

The optical film can be provided with a matting agent to improve sliding bodyty, transportability and easy winding.

The matting agent is preferably made of particles as fine as possible. It is exemplified by inorganic particles and crosslinking polymer particles of silicon dioxide, titanium dioxide, aluminum oxide, zirconium oxide, calcium carbide, karyon, talc, sintered calcium silicate, hydrated calcium silicate, aluminum silicate, magnesium silicate and calcium phosphate.

Of the aforementioned substances, silicon dioxide reduces the degree of film haze, and is preferably used. The particles such as silicon dioxide are often surface-treated by an organic substance. They reduce the film haze and are preferably used.

The surface-treated organic substance preferably used is exemplified by halosilane, alkoxy silane, silazane and siloxane. When the average particle size of the particle is greater, the sliding bodyty effect is greater. Conversely, when the average particle size of the particle is smaller, the transparency is superior. Further, the average size of the secondary particle is 0.05 through 1.0 μm. The average size of the secondary particle is preferably 5 through 50 nm, more preferably 7 through 14 nm. The aforementioned particle is preferably used to form projections and depressions having a thickness of 0.01 through 1.0 μm on the film surface. The amount of particles contained therein is preferably 0.005 through 0.3 percent by mass with respect to cellulose resin.

The particle of silicon dioxide is exemplified by AEROSIL 200, 200V, 300, R972, R972V, R974, R202, R812, OX50, and TT600 (by Nippon Aerosil Co., Ltd.). Of these, AEROSIL 200V, R972, R972V, R974, R202 and R812 are preferably used. Two or more of these particles can be used. When two or more of these particles are used, they can be mixed for use in a desired mixing ratio. In this case, the mass ratio of the particles having different average particle size and different materials, for example, the mass ratio of AEROSIL 200V and R972V is 0.1 to 99.9 through 99.9 to 0.1 is preferred for use.

The matting agent is preferably added before the film constituting material is melted, or is preferably included in the film constituting material in advance. For example, after the particles dispersed in a solvent in advance and other additives such as cellulose resin and/or plasticizer and ultraviolet absorber have been mixed and dispersed, the solvent is volatilized. Alternatively, the matting agent is included in the film constituting material in advance by precipitation method. Use of such a film constituting material provides uniform dispersion of the matting agent in the cellulose resin.

Another object of the particles in the film used as a matting agent is to improve the strength of the film as another object.

For example, when a retardation film is manufactured as an optical film, the retardation inhibitor can be added to adjust the retardation. As described in the Specification of European Patent 911,656A2, the aromatic compound having two aromatic rings can be used as a retardation inhibitor. Two or more types of aromatic compounds can be used in combination. In addition to the aromatic hydrocarbon ring, the aromatic ring of the aforementioned aromatic compound includes an aromatic heterocycle. The aromatic heterocycle is particularly preferred. The aromatic heterocycle is generally an unsaturated heterocycle, and 1,3,5-triazine ring is particularly preferred.

When the stabilizer, plasticizer and the aforementioned other additives are added to the cellulose resin, the total amount including them should be 1 percent by mass or more without exceeding 30 percent by mass with respect to the mass of the cellulose resin, preferably 5 through 20 percent by mass.

In the melting and film making process, the film constituting material is required to produce only a small amount of volatile component or no volatile component at all. This is intended to reduce or avoid the possibility of foaming at the time of heating and melting, thereby causing a defect inside the film or deterioration in the flatness on the film surface.

When the film constituting material is melted, the percentage of the volatile component content is 1 percent by mass or less, preferably 0.5 percent by mass or less, more preferably 0.2 percent by mass or less, still more preferably 0.1 percent by mass or less. In the embodiment of the present invention, reduction in heating from 30° C. to 250° C. is measured and calculated using a differential thermogravimetric analyzer (TG/DTA200 by Seiko Electronic Industry Co., Ltd.). This amount is used to represent the amount of the volatile component contained.

Before film formation or at the time of heating, the aforementioned moisture and volatile component represented by the aforementioned solvent is preferably removed from the film constituting material to be used. It can be removed according to a known drying technique. Heating technique, reduced pressure technique or heating/pressure reduction technique can be utilized. The removing operation can be done in the air or under the atmosphere where nitrogen is used as an inert gas. When the aforementioned known drying technique is used, the temperature should be in such a range that the film constituting material is not decomposed. This is preferred to maintain satisfactory film quality.

Drying before formation of a film reduces the possibility of volatile components being generated. It is possible to dry the resin singly or to dry after separation into a mixture or compatible substance between the resin and at least one of the film constituting materials other than resin. The drying temperature is preferably 100° C. or more. If the material to be dried contains a substance having a glass transition temperature, the material may be welded and may become difficult to handle when heated to the drying temperature higher than the glass transition temperature thereof. Thus, the drying temperature is preferably below the glass transition temperature. If a plurality of substances have glass transition temperatures, the lower glass transition temperature is used as a standard. This temperature is preferably 100° C. or more without exceeding (glass transition temperature −5)° C., more preferably 110° C. or more without exceeding (glass transition temperature −20)° C. The drying time is preferably 0.5 through 24 hours, more preferably 1 through 18 hours, still more preferably 1.5 through 12 hours. If the drying temperature is too low, the volatile component removal rate will be reduced and the drying time will be prolonged. Further, the drying process can be divided into two steps. For example, the drying process may contain two steps; a preliminary drying step for material storage and an immediately preceding drying step to be implemented immediately before film formation through one week before film formation.

The melt-casting film formation method can be classified into molding methods for heating and melting. It is possible to use the melt extrusion molding method, press molding method, inflation method, injection molding method, blow molding method and orientation molding method. Of these, the melt extrusion method is preferred in order to ensure an optical film characterized by excellent mechanical strength and surface accuracy. The following describes the film manufacturing method as an embodiment of the present invention with reference to the melt extrusion method.

FIG. 1 is a schematic flow sheet of an embodiment of the device for performing the method for manufacturing the optical film of this invention. FIG. 2 is an exploded view of the portion from the cast die to the cooling rollers.

Figure 2A:
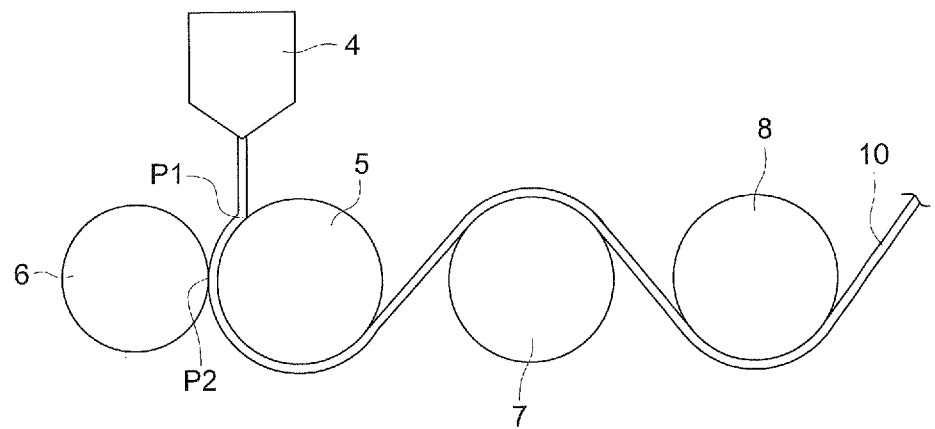
FIG. 2a shows an embodiment in which the contact point of a film is different.
Figure 2B:
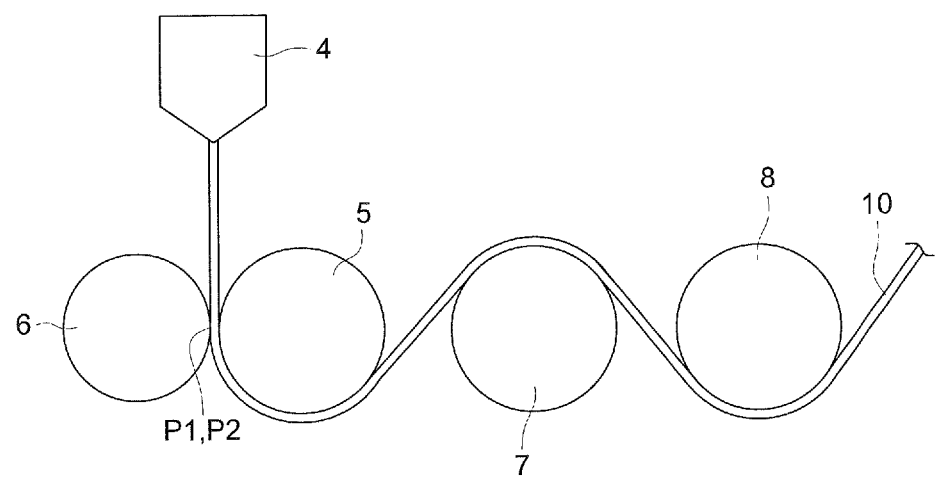
FIG. 2b shows an embodiment in which the contact point of a film is the same.

FIG. 2 (a) is an embodiment in which the point (P1) when the film first contacts the first cooling roller 5 surface and the point (P2) when the film contacts the touch roller 6 surface is different. FIG. 2(b) is an embodiment in which the point (P1) when the film first contacts the first cooling roller 5 surface and the point (P2) when the film contacts the touch roller 6 surface is the same.

In these embodiments, after the film material comprising the cellulose resin is mixed, melt extrusion is performed from the cast die 4 to the first cooling roller 5 using the extruder 1, and the melted film is brought in external contact with the first cooling roller 5 and also pressed with a prescribed force to the first cooling roller 5 using the touch roller 6. Furthermore, the film is successively brought in external contact with the second cooling roller 7 and the third cooling roller 8 to contact a total of three cooling rollers, and thereby perform hardening by cooling, and then the film is peeled using the peeling roller. The film 10 that is peeled is held at both ends by a stretching device 12 and stretched in the width direction and then wound by the winding device 16.

A film (resin mixture) that has been extruded from the casting die 4 is cooled by at least two rotating bodies having a cooling function and then surface correction is done. The rotating member that the film that has been extruded from the casting die 4 first contacts is defined as the first rotating member, and that which it contacts second is defined as the second rotating member. That is to say, in this embodiment, the first cooling roller 5 corresponds to the first rotating member and the touch roller 6 corresponds to the second rotating member. However, the first rotating member and second rotating member of this invention are not limited to rollers and may be drums, belts or the like.

Further, in this embodiment, the temperature of the first cooling roller 5 is made equal to or less than the glass transition temperature (Tg) of a resin mixture and equal to or more than the melting point of the additive agent.

Further, in the optical film producing method in this embodiment, the ratio (S3/S1) of the peripheral speed (S3) of the second cooling roller (the third rotating member for cooling) 7 to the peripheral speed (S1) of the first cooling roller (the first rotating member for cooling) 5 is set to 1.041 to 1.05.

The touch roller 6 is a rotating member used for the purpose of nipping and pressing a film in the direction to the first cooling roller 5 from the opposite side of the first cooling roller (the first rotating member for cooling) 5 in relation to the film. A pressing roller described in Japanese Patent Unexamined Publication No. 11-235747 can be used preferably as the touch roller 6.

The surface of the touch roller 6 is preferably metal and the thickness is 1 mm to 10 mm. The thickness is more preferably 2 mm to 6 mm. The surface of the second rotating member is subjected to treatment such as chrome plating and preferably has a surface roughness of 0.2 S or less. The surface of the obtained film will be smooth to the extent that the roller surface is smooth.

The metal material forming the surface of the touch roller 6 is required to be flat and durable and have suitable elasticity. Carbon steel, stainless steel, titanium and nickel manufactured by electroforming and the like are preferably used. In addition, surface treatment such as hard chrome plating, nickel plating and crystalline chrome plating or ceramic spraying and the like are preferably carried out in order to impart surface roughness and to improve peeling from the resin. The surface that has been subjected to surface processing is preferably further to subjected to polishing such that surface roughness in the above range.

The touch roller 6 has a double structure of an outer cylinder and an inner cylinder made of metal, and the double cylinder preferably has a space such that cold fluid can flow through.

The inner cylinder is preferably made of a metal that is light and rigid such as carbon steel, stainless steel, aluminum, titanium, or the like. Rotational vibration of the roller can be controlled by the inner cylinder provided with rigid. The thickness of the inner cylinder is sufficiently rigid when it is 2 to 10 times the thickness of the outer cylinder. The inner cylinder may be also covered with an elastic material made of resin such as silicone, fluorine rubber and the like.

The structure of the space in which the cold fluid flows should be such that the temperature of the roller surface can be controlled to be uniform, and for example, temperature control can be done by alternating flow back and forth in the width direction or causing the flow to be spiral thus causing temperature distribution on the roller surface to be low. The cold fluid used is not particularly limited and water or oil may be used depending on the temperature region.

In this invention, the touch roller 6 being the second rotating member is preferably a drum in which the outer diameter at the center is larger than the outer diameter at both ends. The touch roller is generally one that presses the film at both ends using a pressurizing means, but because the touch roller will flex in this case, the phenomenon occurs whereby the pressing is greater as the end of the roller is approached. By forming the roller as a drum, highly uniform pressing is possible.

In this invention, the diameter of the touch roller 6 being the second rotating member is preferably in the range 200 mm to 500 mm. The effective width of the touch roller 6 must be wider than the width of the film to be nipped. With the difference between the diameter at the center of the touch roller 6 and the diameter at the end (hereafter, called the crowning amount), it becomes possible to prevent unevenness such as streak and the like which occurs at the center of the film. The crowning amount is preferably in the range from 50 μm to 300 μm.

The first cooling roller 5 and the touch roller 6 are positioned to be opposite to each other across the film surface so as to nip the film between them. The first cooling roller 5 and the touch roller 6 come in surface contact or line contact with a film.

In the optical film manufacturing method as an embodiment of the present invention, melt extrusion conditions can be the same as those used for the thermoplastic resin including other polyesters. In this case, the material is preferably dried in advance. A vacuum or pressure reduced dryer and a dehumidified hot air dryer is preferably used to dry so that the moisture will be 1000 ppm or less, more preferably 200 ppm or less.

For example, the cellulose ester based resin dried by hot air, under vacuum or under reduced pressure is extruded by an extruder 1, and is melted at an extrusion temperature of about 200 through 300° C. This material is then filtered with a leaf disk type filter 2 or the like to remove foreign substances.

When the material is introduced from the supply hopper (not illustrated) to the extruder 1, it is preferred to create a vacuum, pressure reduced environment or inert gas atmosphere, thereby preventing decomposition by oxidation.

If such as additive as a plasticizer is not mixed in advance, it can be added and kneaded during the extrusion process in the extruder. A mixing apparatus such as a static mixer 3 is preferably used to ensure uniform addition.

Resin such as cellulose resin and additives such as a stabilizer to be added as required are mixed preferably before melting. The cellulose resin and stabilizer are more preferably mixed first. A mixer may be used for mixing. Alternatively, mixing may be done in the cellulose resin preparation process, as described above. When the mixer is used, it is possible to use a general mixer such as a V-type mixer, conical screw type mixer, horizontal cylindrical type mixer, and the like.

As described above, after the film constituting material has been mixed, the mixture can be directly melted by the use of the extruder 1, thereby forming a film. It is also possible to make such arrangements that, after the film constituting material has been palletized, the aforementioned pellets are melted by the extruder 1, thereby forming a film. Further, when the film constituting material contains a plurality of materials having different melting points, melting is performed at the temperature where only the material of lower melting point can be melted, thereby producing a patchy half-melt. This half-melt is put into the extruder 1, whereby a film is formed. When the film constituting material contains the material that is easily subjected to thermal decomposition, it is preferred to use the method of creating a film directly without producing pellets for the purpose of reducing the frequency of melting, or the method of producing a patchy half-melt followed by the step of forming a film, as described above.

Various types of extruders sold on the market can be used as the extruder 1, and a melting and kneading extruder is preferably used. Either the single-screw extruder or twin screw extruder may be utilized. If a film is produced directly from the film constituting material without manufacturing the pellet, an adequate degree of kneading is required. Accordingly, use of the twin screw extruder is preferred. However, the single-screw extruder can be used when the form of the screw is modified into that of the kneading type screw such as a Maddox type, Unimelt type and Dulmage type, because this modification provides adequate kneading. When the pellet and patchy half-melt is used as a film constituting material, either the single-screw extruder and twin screw extruder can be used.

In the process of cooling inside the extruder 1 or subsequent to extrusion, the density of oxygen is preferably reduced by replacement with such an inert gas as nitrogen gas or by pressure reduction.

The desirable conditions for the melting temperature of the film constituting material inside the extruder 1 differ depending on the viscosity of the film constituting material, discharge rate or the thickness of the sheet to be produced. Generally, the melting temperature is Tg or more without exceeding Tg+100° C. with respect to the glass transition temperature Tg of the film, preferably Tg 10° C. or more without exceeding Tg+90° C. The melting viscosity at the time of extrusion is 10 through 100000 poises, preferably 100 through 10000 poises. Further, the film constituting material retention time in the extruder 1 is preferably shorter. This time is within 5 minutes, preferably within 3 minutes, more preferably within 2 minutes. The retention time depends on the type of the extruder 1 and conditions for extrusion, but can be reduced by adjusting the amount of the material supplied, and L/D, screw speed, and depth of the screw groove.

The shape and speed of the screw of the extruder 1 are adequately selected according to the viscosity of the film constituting material and discharge rate. In the embodiment of the present invention, the shear rate of the extruder 1 is 1/sec. through 10000/sec., preferably 5/sec. through 1000/sec., more preferably 10/sec. through 100/sec. As an extruder 1 which can be used for the present invention, it can be obtained generally as a plastic molding machine.

The film constituting material extruded from the extruder 1 is sent to the casting die 4 and is extruded from the slit of the casting die 4 in the form of a film.

The molten material extruded from the extruder 1 is fed to the casting die 4. There is no restriction to the casting die 4 if it can be used to manufacture a sheet and film. The material of the casting die 4 is exemplified by hard chromium, chromium carbide, chromium nitride, titanium carbide, titanium carbon nitride, titanium nitride, cemented carbide and ceramics (e.g., tungsten carbide, aluminum oxide, chromium oxide), which are sprayed or plated, and are subjected to surface treatment by buffing, lapping with a grinding wheel having a count 1000 and after, plane cutting with a diamond wheel having a count 1000 (cutting in the direction perpendicular to the resin flow), electrolytic polishing, and composite electrolytic polishing.

The preferred material of the lip of the casting die 4 is the same as that of the casting die 4. The surface accuracy of the lip is preferably 0.5 S or less, more preferably 0.2 S or less.

In this invention, the resin mixture that has been melted is extruded as a film-like resin from the casting die 4 that is mounted on the extruder, and the extruded film-like resin is adhered to at least two rotating bodies and then taken out.

The thickness of the optical film according to the present invention is preferably 30 to 200 μm.

As shown in FIG. 1 and FIG. 2, in the method for manufacturing an optical film of this invention, the glass transition temperature Tg of the optical film, the film temperature T1 at the casting die 4 exit, the film temperature T2 at the point (P1) of first contact with the first cooling roller 5 surface and the film temperature T3 at the point (P2) of contact with the touch roller 6 surface are set so as to have the following relationships.

$$T1-60° C. \leq T2 \leq T1 \tag{A}$$

$$T2-20° C. \leq T3 \leq T2 \tag{B}$$

$$Tg+60° C. < T1 < Tg+130° C. \tag{C}$$

$$Tg < T2 < Tg+120° C. \tag{D}$$

$$Tg < T3 < Tg+110° C. \tag{E}$$

T1 herein is the film temperature at the moment when it is extruded from the lip of the casting die 4 and the temperature can be measured by a commercially available contact type or non-contact type thermometer.

In this embodiment, T1−60° C.≤T2≤T1, that is, the temperature reduction from the time that the resin melt was extruded from the casting die 4 to the time that the resin melt comes in contact with the first cooling roller 5 is made 60° C. or less. If the temperature reduction from the time that the resin melt was extruded from the casting die 4 to the time that the resin melt comes in contact with the first cooling roller 5 is more than 60° C., contraction following cooling becomes uneven, and as a result, the unevenness in the thickness of the obtained film becomes large. In order to make the temperature reduction from the casting die 4 to the point coming in contact with the first cooling roller 5 to 60° C. or less, it is preferable to keep or warm the temperature in the vicinity of the casting die 4 and the first cooling roller 5 by providing an enclosure for the space including the casting die 4 and the first cooling roller 5 and by conducting air conditioning for the space inside the enclosure.

In addition, it is preferable that the temperature reduction from the time that the film firstly came in contact with the surface of the first cooling roller 5 to the time that the film comes in contact with the surface of the touch roller 6 is preferably 20° C. or less. If the temperature reduction from the time that the film firstly came in contact with the surface of the first cooling roller 5 to the time that the film comes in contact with the surface of the touch roller 6 is too large, the unevenness in the thickness becomes large due to non-uniform contraction. In addition, if the temperature of the film at the time that the film comes in contact with the surface of the touch roll 6 is too low, since the viscosity of the film becomes too high, film flatness and correction of unevenness in thickness may not be made sufficiently even if the film is nipped by the touch roller.

The film temperature (T1) immediately after extrusion from the casting die 4 is preferably within the range (Tg+60° C.<T1<Tg+130° C.). More preferably, T1 is in the range of ($Tg+70°$ C.$<T1<Tg+120°$ C.) and still more preferably in the range of ($Tg+80°$ C.$<T1<Tg+110°$ C.).

If T1 is ($Tg+60°$ C.) or less, the viscosity of the resin mixture will become too high and the height of the die lines will be too high. If T1 is ($Tg+130°$ C.) or more, the deterioration of the resin mixture will take place, and the smoothness of the film surface will be failed.

Further, in this embodiment, the temperature (T2) at the time that the film comes in contact with the first cooling roller 5 is preferably set within the range ($Tg$ c $T2 <Tg+120°$ C.), and more preferably ($Tg+10°$ C.$<T2<Tg+100°$ C.), and even more preferably ($Tg+20°$ C.$<T2<Tg+80°$ C.).

After the film came in contact with the first cooling roller 5, it comes in contact with the touch roller with the opposite film surface. The temperature (T3) at the time that the film contacts the touch roller 6 is preferably set within the range ($Tg<T3<Tg+110°$ C.), and more preferably ($Tg+10°$ C.$<T2<Tg+90°$ C.), and even more preferably ($Tg+20°$ C.$<T2<Tg+70°$ C.).

If the film temperature at the time that the film comes in contact with the first cooling roller 5 or the touch roller 6 is lower than the above ranges, sufficient die line correction will become difficult. In addition, if this temperature is too high, the roller will not contact the film surface uniformly and die line correction will become difficult.

Here, in order to suppress the unevenness in film thickness to small, it is important to satisfy the relation (A) among the above-mentioned relations (A) to (E). However, it is more desirable to satisfy also the relations (B) to (E), and it is most desirable to satisfy all of the relations (A) to (E).

Examples of preferable materials for forming the first cooling roller 5 and the touch roller 6 include carbon steel, stainless steel, resin and the like. In addition, increasing surface roughness is preferable and the surface roughness is preferably 0.3 S or less, and more preferably 0.1 S or less. In addition to the solid structure, the touch roller may be have a structure in which a thin metal sleeve is backed up with an elastic roller such as one made of rubber, or it may be a thin metal roller.

The touch roller 6 is preferably to press a film onto the first cooling roller 5 by a pressing means. At this time, the linear pressure with which the touch roller 6 presses the film can be adjusted by an oil pressure piston or the like and is preferably 0.1 to 100 N/mm and more preferably 1 to 50 N/mm.

In order to enhance uniformity in contact with film, the first cooling roller 5 or the touch roller 6 may be shaped to reduce the diameter at both ends of the roller or to have a flexible roller surface.

It has been found out that, if the pressure is reduced to 70 kPa or less in the portion from the opening (lip) of the casting die 4 to the first roll 5, the aforementioned die line can be effectively corrected. In this case, this pressure is preferably reduced to 50 kPa or more without exceeding 70 kPa. There is no restriction to the method for ensuring that the pressure in the portion from the opening (lip) of the casting die 4 to the first roll 5 is kept at 70 kPa or less. For example, it is possible to reduce the pressure if the portion around the roll from the casting die 4 is covered with a pressure resistant member. In this case, a suction apparatus is preferably heated by a heater so that a sublimate is not deposited on the apparatus per se. In the embodiment of the present invention, if the suction pressure is too small, a sublime cannot be effectively sucked. This requires an appropriate suction pressure to be selected.

In this embodiment, while the molten film-like cellulose ester-based resin coming from the casting die 4 is conveyed by sequential contact with the first roll (the first cooling roll) 5, second cooling roll 7 and third cooling roll 8, the resin is cooled and solidified, whereby a cellulose ester based resin film 10 is obtained.

In the embodiment shown in FIG. 1, the film 10 which is separated from the third cooling roll 8 by the separation roll 9 and is cooled, solidified and unoriented is led to the stretching machine 12 through the dancer roll (film tension adjusting roll) 11. The film 10 is drawn or stretched in the lateral direction (across the width) by this stretching machine (stretching machine). This process of stretching causes the molecules to be oriented in the film.

The film can be stretched across the width preferably by a known tenter. As described above, the film is stretched across the width. This arrangement preferably allows the lamination layer with the polarizing film to be implemented in the form of a roll. Stretching across the width ensures that the low axis of the optical film made up of the cellulose ester based resin film is oriented across the width.

On the other hand, the transmission axis of the polarizing film is also oriented across the width. The polarizing plate is incorporated into the liquid crystal display apparatus, wherein this polarizing plate is laminated in such a way that the transmission axis of the polarizing film and the low axis of the optical film will be parallel to each other. This arrangement improves the display contrast of the liquid crystal display apparatus, and provides an excellent angle of field.

In the manufacturing method of this invention, when the optical film is manufactured, an optical film having a surface roughness Ra of 0.1 μm or less, or 0.05 μm or less is obtained. The variation in the film thickness in the width direction (entire width of the film) is not more than ±3%, and more preferably not more than ±2% with respect to the average film thickness. "Average film thickness" refers to the average value of the thickness of the entire film excluding the both ends (margins) from the necking. The surface roughness of the film and the variation in film thickness may be measured by known methods. For example, for the film surface roughness, there is a method in which the film surface is measured at about 5 mm using a surface roughness meter and compared with the average roughness (Ra). In addition, the film thickness variation may be measured with a film thickness meter, and the standard deviation is determined and width variation with respect to the average film thickness can be compared.

The film that has been peeled from the cooling drum is preferably stretched in a single stage or in multiple stages in the longitudinal direction via one or a plurality of roller groups and/or a heating device such as an infrared heater or the like. At this time, given that the glass transition temperature of the film is Tg, it is preferable that the film is heated in the range between ($Tg-30$)° C. and ($Tg+100$)° C. and more preferably in the range between ($Tg-20$)° C. and ($Tg+80$)° C. and then stretched in the conveyance direction.

Next, it is preferable that the film that has been stretched in the conveyance direction is stretched transversely in the temperature range between ($Tg-20$)° C. and ($Tg+20$)° C., and then fixed by heating.

In the case of transverse stretching, it is preferable that stretching is done while temperature is successively increased at 2 or more stretch regions in which temperature difference is in the range 1 to 50° C., and thickness in the width direction and optical distribution are reduced.

The glass transition temperature Tg of the film constituting material can be controlled when the types of the materials constituting the film and the proportion of the constituting materials are made different. When the retardation film is manufactured as an optical film, Tg is 120° C. or more, preferably 135° C. or more. In the liquid crystal display apparatus, the film temperature environment is changed in the image display mode by the temperature rise of the apparatus per se, for example, by the temperature rise caused by a light source. In this case, if the Tg of the film is lower than the film working environment temperature, a big change will occur to the retardation value and film geometry resulting from the orientation status of the molecules fixed inside the film by stretching. If the Tg of the film is too high, temperature is raised when the film constituting material is formed into a film. This will increase the amount of energy consumed for heating. Further, the material may be decomposed at the time of forming a film, and this may cause coloring. Thus, Tg is preferably kept at 250° C. or less.

The process of cooling and relaxation under known thermal setting conditions can be applied in the stretching process. Appropriate adjustment should be made to obtain the characteristics required of the intended optical film.

In the case that a retardation film is produced, the aforementioned stretching process and thermal setting process are applied as appropriate to provide the retardation film function for the purpose of improving the physical property of the retardation film and to increase the angle of field in the liquid crystal display apparatus. That is, when a retardation film is produced as an optical film and the functions of the polarizing plate protective film are combined, control of the refractive index is essential. The refractive index control can be provided by the process of stretching. The process of stretching is preferred. The following describes the method for stretching.

In the retardation film stretching process, required retardations Ro and Rth can be controlled by a stretching magnification of 1.0 through 2.0 in one direction of the cellulose resin, and a stretching magnification of 1.01 through 2.5 times in the direction perpendicular to the inner surface of the film. Here Ro denotes an in-plane retardation. It represents the thickness multiplied by the difference between the refractive index in the longitudinal direction MD in the same plane and that across the width TD. Rth denotes the retardation along the thickness, and represents the thickness multiplied by the difference between the refractive index (an average of the values in the longitudinal direction MD and across the width TD) in the same plane and that along the thickness.

Stretching can be performed sequentially or simultaneously, for example, in the longitudinal direction of the film and in the direction perpendicular in the same plane of the film, namely, across the width. In this case, if the stretching magnification at least in one direction is insufficient, sufficient retardation cannot be obtained. If it is excessive, stretching difficulties may occur and the film may break.

Stretching in the biaxial directions perpendicular to each other is an effectively way for keeping the film refractive indexes nx, ny and nz within a predetermined range. Here nx denotes a refractive index in the longitudinal direction MD, ny indicates that across the width TD, and nz represents that along the thickness.

When the material is stretched in the melt-casting direction, the nz value will be excessive if there is excessive shrinkage across the width. This can be improved by controlling the shrinkage of the film across the width or by stretching across the width. In the case of stretching across the width, distribution may occur to the refractive index across the width. This distribution may appear when a tenter method is utilized. Stretching of the film across the width causes shrinkage force to appear at the center of the film because the ends are fixed in position. This is considered to be what is called "bowing". In this case, bowing can be controlled by stretching in the casting direction, and the distribution of the retardation across the width can be reduced.

Stretching in the biaxial directions perpendicular to each other reduces the fluctuation in the thickness of the obtained film. Excessive fluctuation in the thickness of the retardation film will cause irregularity in retardation. When used for liquid crystal display, irregularity in coloring or the like will occur.

The fluctuation in the thickness of the cellulose resin film is kept within the range of ±3%, preferably ±1%. To achieve the aforementioned object, it is effective to use the method of stretching in the biaxial directions perpendicular to each other. In the final phase, the magnification rate of stretching in the biaxial directions perpendicular to each other is preferably 1.0 through 2.0 in the casting direction, and 1.01 through 2.5 across the width. Stretching in the range of 1.01 through 1.5 in the casting direction and in the range of 1.05 through 2.0 across the width will be more preferred to get a retardation value.

When the absorption axis of the polarizer is present in the longitudinal direction, matching of the transmission axis of the polarizer is found across the width. To get a longer polarizing plate, the retardation film is preferably stretched so as to get a low axis across the width.

When using the cellulose resin to get positive double refraction with respect to stress, stretching across the width will provide the low axis of the retardation film across the width because of the aforementioned arrangement. In this case, to improve display quality, the low axis of the retardation film is preferably located across the width. To get the target retardation value, it is necessary to meet the following condition:

(Stretching Magnification Across the Width)>(stretching magnification in casting direction)

After stretching, the end of the film is trimmed off by a slitter 13 to a width predetermined for the product. Then both ends of the film are knurled (embossed) by a knurling apparatus made up of an emboss ring 14 and back roll 15, and the film is wound by a winder 16. This arrangement prevents sticking in the optical film F (master winding) or scratch. Knurling can be provided on the lateral surface by heating and pressing a metallic ring having a pattern of projections and depressions. The gripping portions of the clips on both ends of the film are normally deformed and cannot be used as a film product. They are therefore cut out and are recycled as a material.

When the retardation film is used as a protective film of the polarizing plate, the thickness of the aforementioned protective film is preferably 10 through 500 μm. Especially the lower limit is 20 μm or more, preferably 35 μm or more. The upper limit is 150 μm or less, preferably 120 μm or less. A particular preferred range is 25 through 90 μm. If the retardation film is too thick, the polarizing plate subsequent to machining will be too thick. This fails to meet low-profile light weight requirements when employed in the liquid crystal display for a notebook PC or mobile type electronic equipment. Conversely, if the retardation film is too thin, retardation as a retardation film cannot occur easily. Further, the film moisture permeability will be increased, with the result that the polarizer cannot be effectively protected from moisture. This must be avoided.

The low axis or high axis of the retardation film is present in the same plane of the film. Assume that the angle formed with the direction of film formation is θ1. Then the θ1 should be −1 degrees or more without exceeding +1 degrees, preferably −0.5 degrees or more without exceeding +0.5 degrees.

This θ1 can be defined as an orientation angle. It can be measured by an automatic double refractometer KOBRA-21ADH (by Oji Scientific Instruments).

If θ1 meets the aforementioned formula, a high degree of brightness is ensured in the display image and a leakage of light is reduced or prevented, with the result that faithful color representation is provided in the color liquid crystal display apparatus.

When the retardation film as an embodiment of the present invention is used in the multiple-domain VA mode, the arrangement of the retardation film improves the display quality of the image if the high axis of the retardation film is θ1, and the film is arranged in the aforementioned area.

Figure 3:
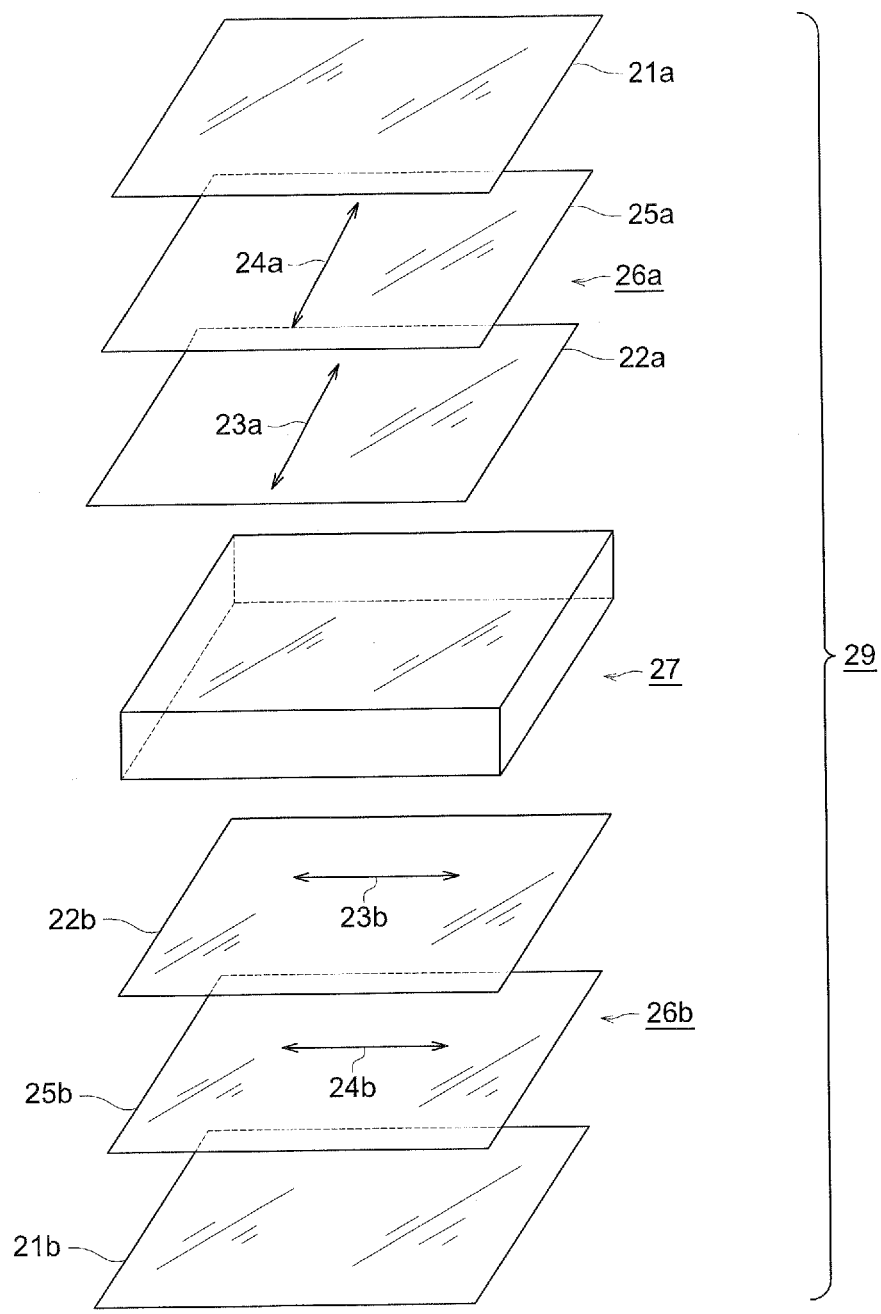
FIG. 3 is an exploded perspective view showing an outline of a structure of a liquid crystal display apparatus made into a MVA mode.

FIG. 3 shows a structure when the polarizing plate and liquid crystal display apparatus are set to MVA mode.

In FIG. 3, the reference numerals 21a and 21b indicate protective films, 22a and 22b represent retardation films, 25a and 25b show polarizers, 23a and 23b indicate the low-axis directions of the film, 24a and 24b show the directions of the polarizer transmission axis, 26a and 26b denote polarizing plates, 27 shows a liquid crystal cell, and 29 denotes a liquid crystal display apparatus.

The distribution of the retardation Ro in the in-plane direction of the optical film is adjusted to preferably 5% or less, more preferably 2% or less, still more preferably 1.5% or less. Further, the distribution of retardation Rt along the thickness of the film is adjusted to preferably 10% or less, more preferably 2% or less, still more preferably 1.5% or less.

The retardation distribution value is obtained by measuring retardation of the obtained film at 1 cm intervals in the width direction and shows the coefficient of variation (CV) of the obtained retardation. The method for measuring the value of the distribution can be one in which standard deviation using the (n−1) method is obtained for the retardation in the plane and thickness directions respectively, and the coefficient of variation (CV) shown below is obtained and used as an index. In this measurement, the calculation can be made with n set at 130 to 140.

Coefficient of variation (CV)=standard deviation/average value of retardation.

In the retardation film, it is preferable that the retardation value of the distribution variation is small, and when a polarizing plate including a retardation film is used in the liquid crystal display device, it is preferable that the retardation distribution variation is small in view of preventing color unevenness.

The retardation film may have retardation value wavelength dispersion, and in the case where it is used in the liquid crystal element as above, wavelength dispersion can be suitably selected in order to improve display quality. Here, as is the case with the 590 nm measurement value Ro for the retardation film, the planar retardation at 450 nm is defined as R450 and the planar retardation at 650 nm is defined as R650.

In the case when an MVA which is described hereinafter is used wavelength dispersion in planar retardation of the retardation film is preferably in the range 0.7<(R450/Ro)<1.0 and 1.0<(R650/Ro)<1.5, and more preferably in the range 0.7<(R450/Ro)<0.95 and 1.01<(R650/Ro)<1.2 and even more preferably in the range 0.8<(R450/Ro)<0.93 and 1.02<(R650/Ro)<1.1 in order for color reproduction in the display to be effective.

In order to adjust the retardation film so as to provide the retardation value suited for improvement of the display quality of the liquid crystal cell in the VA mode or TN mode and to divide the aforementioned multi-domain especially in the VA mode for preferable use in the MVA mode, adjustment must be made to ensure that the in-plane retardation Ro is greater than 30 nm without exceeding 95 nm, and retardation Rt along the thickness is greater than 70 nm without exceeding 400 nm.

In the configuration, for example shown in FIG. 3, wherein two polarizing plates are arranged in a crossed-Nicols configuration and a liquid crystal cell is arranged between the polarizing plates, assume a crossed-Nicols configuration with respect to the standard wherein observation is made from the direction normal to the display surface. When viewed from the line normal to the display surface, a deviation occurs from the crossed-Nicols arrangement of the polarizing plate, and causes the leakage of light. This leakage is mainly compensated for by the aforementioned in-plane retardation Ro.

In the aforementioned TN mode and VA mode, particularly in the MVA mode, when the liquid crystal cell is set to the black-and-white display mode, the retardation along the thickness mainly compensates for the double refraction of the liquid crystal cell recognized when viewed in a slanting direction in the same manner.

As shown in FIG. 3, when two polarizing plates are arranged on the upper and lower portions of the liquid crystal cell in the liquid crystal display apparatus, the reference numerals 22a and 22b in FIG. 3 are cable of selecting the distribution of retardation Rt along the thickness. It is preferred to ensure that the requirements of the aforementioned range are met, and the total of both of the retardations Rt along the thickness retardation Rt is greater than 140 nm without exceeding 500 nm. In this case, the in-lane retardation Ro of the 22a and 22b and retardation Rt along the thickness retardation Rt are the same. This is preferred to improve the productivity of industrial polarizing plates. It is particularly preferred that the in-plane retardation Ro is greater than 35 nm without exceeding 65 nm, the retardation Rt along the thickness retardation Rt is greater than 90 nm without exceeding 180 nm, and the structure shown in FIG. 3 is applied to the liquid crystal cell in the MVA mode.

In the liquid crystal display apparatus, assume that the TAC film having an in-plane retardation Ro of 0 through 4 nm, a retardation Rt along the thickness of 20 through 50 nm and a thickness of 35 through 85 μm is used at the position 22b in FIG. 3 as one of the polarizing plates, for example, as a commercially available polarizing plate protective film, for example. In this case, the polarizing film arranged on the other polarizing plate, for example, the polarizing film arranged in 22a of FIG. 3 is preferred to have an in-plane retardation Ro of greater than 30 nm without exceeding 95 nm, and the retardation Rt along the thickness of greater than 140 nm without exceeding 400 nm. This arrangement improves the display quality and film productivity.

<Liquid Crystal Display Apparatus>

The polarizing plate including the retardation film in the embodiment of the present invention provides higher display quality than the normal polarizing plate. This is particularly suited for use in a multi-domain type liquid crystal display apparatus, more preferably to the multi-domain type liquid crystal display apparatus in the double refraction mode.

To make in multi-domain type is suitable also for improvement in the symmetry of image presentation and various methods are reported, "Okita, Yamauchi: Liquid crystal, 6(3), 303 (2002)". Since this liquid crystal display cell is also indicated in "Yamada, Yamahara: Liquid crystal, 7(2), 184 (2003)", it is not limited to these.

The polarizing plate employing an optical film of the present invention can be used effectively in a MVA (Multi-domain Vertical Alignment) mode represented with a vertical alignment mode, especially a four division type MVA mode, a well-known PVA (Patterned Vertical Alignment) mode which is made into multi-domain by an electrode arrangement, and a CPA (Continuous Pinwheel Alignment) mode in which the Chiral function and an electrode arrangement are united.

Further, for the adaptation for an OCB (Optical Compensated Bend) mode, a proposal with regard to a film having a biaxial property optically is disclosed "T. Miyashita, T. Uchida: J.SID, 3(1), 29 (1995)". Therefore, it is possible to exhibit a display quality effect by a polarizing plate employing an optical film of the present invention.

If a display quality effect can be exhibited with a polarizing plate employing an optical film of the present invention, the arrangement of the polarizing plate is not limited.

It is desirable that the display quality of a display cell is symmetrical in observation of people. Therefore, when the display cell is a liquid crystal display cell, a domain can be made into multi with priority substantially given to the symmetry at the side of observation. A domain can be divided by adopting a well-known method and the method can be determined in consideration of the nature of a well-known liquid crystal mode by two-dividing method, more preferably four-dividing method.

The liquid crystal display apparatus is coming into practical use as a colored and animation display apparatus. The display quality is improved by the embodiment of the present invention. The improved contrast and enhanced polarizing plate durability ensure faithful animation image display without easy fatigue.

In the liquid crystal display apparatus containing at least the polarizing plate incorporating a retardation film in the embodiment of the present invention, one polarizing plate containing the retardation film in the embodiment of the present invention is arranged on the liquid crystal cell, or two polarizing plates are arranged on both sides of the liquid crystal cell. In this case, the display quality is improved when means are provided to ensure that the side of the retardation film in the embodiment of the present invention contained in the polarizing plate faces the liquid crystal cell of the liquid crystal display apparatus. Then the films 22a and 22b of FIG. 3 face the liquid crystal cell of the liquid crystal display apparatus. In the aforementioned structure, the retardation film can provide optical compensation of the liquid crystal cell.

In the polarizing plate, a polarizing plate protective film of cellulose derivative is used on the surface opposite the retardation film as viewed from the polarizer. A general-purpose TAC film or the like can be employed. The polarizing plate protective film located far from the liquid crystal cell can be provided with another functional layer for the purpose of improving the quality of the display apparatus.

To an optical film of the present invention, for example, functions of antireflection, antiglare, scratch resistant and dust adhesion protection, brightness enhancement and the like may be added. These functional layers may be pasted onto the surface of a polarizing plate. However, it is not limited to these.

Generally, to ensure stable optical characteristics, the retardation film is required to exhibit small fluctuations in the Ro or Rth as the aforementioned retardation value. Especially, these fluctuations may cause irregularities of an image in the liquid crystal display apparatus in the double refraction mode.

In films manufactured using the liquid casting method, the retardation value may change depending on evaporation of an extremely small amount of organic solvent remaining in the film. In the long retardation film is manufactured, stored and transported in a long roll state, and is processed into a polarizing plate by a worker in the polarizing plate manufacturing industry or the like. Thus residual solvent is present and evaporation is reduced as the inside of the roll is approached. As a result, difference in concentration of the small amount of the residual solvent is generated from the outside to the inside of the roll and from both ends to the center of the roll, in the width direction, and these trigger changes with time and variation in the retardation value.

Meanwhile, in this invention, because film is manufactured by melt casting, unlike in liquid casting, there is no solvent to cause evaporation. Therefore, a roll-shaped film is obtained in which there is little change with time and variation in the retardation value.

The film that is manufactured by melt casting according to this invention is excellent in that, because cellulose resin is the main component, characteristic saponification of the cellulose resin and an alkali processing step can be utilized. In the case where the resin for forming the polarizer is polyvinyl alcohol, as is the case for the polarizing plate protective film of the prior art, the retardation film of this invention can be adhered using completely saponification polyvinyl alcohol solvent. Thus this invention is excellent in that the polarizing plate processing method of the prior art can be used and the long polarizing plate in particular can be used.

The manufacturing effect obtained by this invention is particularly remarkable in a long roll of 100 m or more, and the manufacturing effect for manufacturing polarizing plates is obtained to the extent that the length is increased in 1500 m, 2500 m, and 5000 m rolls.

For example, in retardation film manufacturing, the roll length is preferably between 10 m and 5000 m and preferably between 50 m and 4500 m in view of productive efficiency and transporting, and the film width can be suitably selected based on the width of the polarizer and the width used in the manufacturing line. A film is produced with a width of 0.5 m or more and 4.0 m or less, preferably 0.6 m or more and 3.0 m or less, is wound up in a roll-form and is provided to a production process of a polarizing plate. Alternatively, a film is produced with a width larger than two times of a target width and is wound up in a roll form. Thereafter, the film in the roll form is cut into a roll film with a target width, and the roll film may be used in the production process of a polarizing plate.

In the case where the width in the longitudinal direction of the casting die exit is more than 1500 mm, it is possible to obtain a product which is an optical film with a length that exceeds 2000 mm after stretching is performed. In this invention in order to achieve the effect of obtaining a highly smooth film in particular, the width in the longitudinal direction of the casting die exit should be 1500 mm to 4000 mm and more particularly 1700 mm to 4000 mm. The film having a casting width that exceeds 4000 mm is not suitable for practical use as it is expected that stability will be low in the subsequent conveyance step.

In the case where the thickness of the film that is nipped between the first rotating member and the second rotating member is 15 μm to 80 μm, a film with particularly high level of smoothness can be obtained. In the case where the thickness of the film that is nipped between the first rotating member and the second rotating member is 15 μm to 80 μm, after stretching is performed, a product which is a 10 μm to 70 μm optical film can be obtained. In the case where the thickness of the film that is nipped between the first rotating member and the second rotating member is thinner than 15 μm, there is a high risk that ends of the first rotating member and the second rotating member will contact each other, and thus this is not favorable.

When manufacturing the retardation film, a functional layer such as an antistatic layer, a hard coated layer, an easily-sliding ability, an adhesive layer, an antiglare layer and a barrier layer may be coated before and/or after stretching. In this case, various forms of surface treatment such as corona discharging, plasma processing, medical fluid treatment can be provided wherever required.

In the film making process, the gripping portions of the clips on both ends of the film having been cut can be recycled as the material of the same type or different type of films, after having been pulverized, or after having been pelletized as required.

An optical film of lamination structure can be produced by co-extrusion of the compositions containing cellulose resins having different concentrations of additives such as the aforementioned plasticizer, ultraviolet absorber and matting agent. For example, an optical film made up of a skin layer, core layer and skin layer can be produced. For example, a large quantity of matting agent can be put into the skin layer or the matting agent can be put only into the skin layer. Larger amounts of plasticizer and ultraviolet absorber can be put into the core layer than the skin layer. They can be put only in the core layer. Further, the types of the plasticizer and ultraviolet absorber can be changed in the core layer and skin layer. For example, it is also possible to make such arrangements that the skin layer contains a plasticizer and/or ultraviolet absorber of lower volatility, and that the core layer contains a plasticizer of excellent plasticity or an ultraviolet absorber of excellent ultraviolet absorbing performance. The glass transition temperatures between the skin layer and core layer can be different from each other. The glass transition temperature of the core layer is preferably lower than that of the skin layer. In this case, the glass transition temperatures of both the skin and core are measured, and the average value obtained by calculation from the volume fraction thereof is defined as the aforementioned glass transition temperature Tg so that it is handled in the same manner. Further, the viscosity of the melt including the cellulose ester at the time of melt-casting may be different between the skin layer and core layer. The viscosity of the skin layer may be greater than that of the core layer. Alternatively, the viscosity of the core layer may be equal to or greater than that of the skin layer.

Assuming that the dimension of film when the film is left to sand for 24 hours at a temperature of 23° C. with a relative humidity of 55% RH is made as the standard, the dimensional stability of the optical film of the present embodiment is such that the fluctuation of the dimension at 80° C. and 90% RH is less than ±2.0%, preferably less than ±1.0% or less, more preferably less than ±0.5%.

When the optical film of the present embodiment is used as a protective film of the polarizing plate as the retardation film, if the retardation film has a fluctuation in excess of the aforementioned range, the absolute value of the retardation as a polarizing plate and the orientation angle will deviate from the initial setting. This may cause reduction in the capacity of improving the display quality, or may result in deterioration of the display quality.

The retardation film of the present invention can be used for the polarizing plate protective film. When used as a polarizing plate protective film, there is no restriction to the method of producing the polarizing plate. The polarizing plate can be manufactured by a commonly used method. The retardation film having been obtained is subjected to alkaline treatment. Using an aqueous solution of completely saponified polyvinyl alcohol, the polarizing plate protective film is bonded on both surfaces of the polarizer manufactured by immersion the polyvinyl alcohol film in an iodonium solution and by stretching the same. When this method is used, the retardation film as the polarizing plate protective film in the embodiment of the present invention is directly bonded to at least one of the surfaces of the polarizer.

Instead of the aforementioned alkaline treatment, the film can be provided with simplified adhesion as disclosed in the Japanese Non-Examined Patent Application Publication (Tokkaihei) 6-94915 and Japanese Non-Examined Patent Application Publication (Tokkaihei) 6-118232.

The polarizing plate is made up of a polarizer and a protective film for covering both surfaces thereof. Further, a protective film can be bonded onto one of the surfaces of the aforementioned polarizing plate and a separate film can be bonded on the opposite surface. The protective film and separate film are used to protect the polarizing plate at the time of product inspection before shipment of the polarizing plate. In this case, the protective film is bonded to protect the surface of the polarizing plate, and is used on the surface opposite to the surface wherein the polarizing plate is bonded to the liquid crystal substrate. Further, the separate film is used to cover the adhesive layer to be bonded to the liquid crystal substrate, and is used on the surface wherein the polarizing plate is bonded to the liquid crystal cell.

Example 1

| (Resin mixture) | |
| --- | --- |
| Cellulose acetate propionate (the degree of acetyl group substitution: 1.4, the degree of propionyl group substitution: 1.35, number average molecular weight: 60000) | 89 weight % |
| Trimethylolpropane tribenzoate (Plasticizer, a melting point of 85° C.) | 9 weight % |
| Antioxidant (IRGANOX XP 420/FD) (manufactured by Ciba Speciality Chemicals Corp.) | 0.25 weight % |
| Ultraviolet absorber (TINUVIN 928, manufactured by Ciba Speciality Chemicals Corp., a melting point of 115° C.) | 1.6 weight % |
| Matting agent (silica particle) (SEAHOSTAR KEP-30: manufactured by NIPPON SHOKUBAI Co., Ltd., average particle diameter of 0.3 μm) | 0.15 weight % |

Here, the measurement of a degree of substitution of acyl groups of cellulose acetate propionate, such as an acetyl group, a propionyl group, and a butyryl group, was conducted in accordance with the method specified in ASTM-D 817-96.

After above-mentioned materials were mixed by a V shaped mixer for 30 minutes, the resultant mixture was melted at 230° C. under an atmosphere of nitrogen by the use of a double screw extruder equipped with a strand die, whereby cylindrical pellets with a length of 4 mm and a diameter of 3 mm was produced. The obtained pellets had a glass transformation point (Tg) of 135° C.

The above pellets were dried at 100° C. for 5 hours, so that the water content of the pellets was made to 100 ppm, and then these pellets were supplied to a single screw extruder 1 equipped with a T die 4 shown in FIG. 1 in such a way that a film production was conducted. The molten material was made to contain 11 weight % of an additive agent other than resin.

In the single screw extruder 1 (a screw diameter of 90 mm, L/D=30), the number of rotations of the screw was adjusted in such a way so that an extrusion amount became 140 kg/h.

From the vicinity of a material feed hopper, nitrogen gas was introduced, whereby the inside of the extruder 1 was maintained with a nitrogen atmosphere. The temperature of the extruder 1 and the T die 4 was set to 240° C. The T die 4 was a coat hanger type, had a width of 1900 mm, is provided with an inner wall which was applied with hard chrome plating and finished to a mirror surface with a surface roughness of 0.1 S. The T die 4 has a lip clearance set to 2 mm.

As shown in FIG. 2a, a film extruded from the T die 4 was made to drop on the first cooling roller (first rotating member for cooling) 5 with a chrome plating mirror surface having a roll width of 2400 mm, simultaneously, the film on the first cooling roller was pressed by the touch roller (second rotating member for pressing) 6 having a roll width of 2400 mm and a temperature adjusted to 100° C.

At this time, the surface temperature of the first cooling roller (first rotating member for cooling) 5 was set to 120° C. which was less than the glass transition temperature (Tg=135° C.) of resin and was more than the melting point of an additive agent (the melting point of 85° C. of a plasticizer and the melting point of 115° C. of an ultraviolet absorber). Further, the touch roller (second rotating member for pressing) 6 pressed the film with a line pressure of 5 N/mm.

The film which was pressed between the first cooling roller (first rotating member for cooling) 5, and the touch roller (second rotating member for pressing) 6 was brought successively in contact with the external surface of each of the second cooling roller (the third rotating member for cooling) 7 and the third cooling roller (the fourth rotating member for cooling) 8, that is, the external surface of a total of three cooling rollers, whereby the film was cooled and solidified, and then the film was separated by the separating roller 9.

Here, the ratio (S3/S1) of the peripheral velocity (S3) of the second cooling roller (third rotating member for cooling) 7 to the peripheral velocity (S1) of the first cooling roller (first rotating member for cooling) 5 was set to 1.002.

The both ends of the separated film 10 were gasped by a stretching apparatus 12, and then the film 10 was stretched in its width direction by the stretching apparatus 12. Thereafter, the edges of the film 10 were slit by a slitting machine 13, and the resultant cellulose acetate propionate film with a width of 1500 mm was wound up a winder (winding up apparatus) 16.

Examples 2 to 11

In Examples 2 to 11, cellulose acetate propionate films were produced in the same way as that in Example 1. However, cellulose acetate propionate films were produced in such a way that while the surface temperature of the first cooling roller (first rotating member for cooling) 5 was set within the range of the present invention, the line pressure of the touch roller (second rotating member for pressing) 6 and the ratio (S3/S1) between the peripheral velocity (S1) of the first cooling roller (first rotating member for cooling) 5 and the peripheral velocity (S3) of the second cooling roller (third rotating member for cooling) 7 were changed variously.

Comparative Examples 1 to 3

In Comparative examples 1 to 3, cellulose acetate propionate films were produced in the same way as that in Example 1. However, for the purpose of comparison, cellulose acetate propionate films were produced in such a way that the surface temperature of the first cooling roller (first rotating member for cooling) 5 was changed to the outside of the range of the present invention.

(Evaluation of Stains on the First Cooling Roller)

In each of Examples 1 to 11 and Comparative examples 1 to 3, the melt casting film production was conducted for three hours, and then stains on the first cooling roller (first rotating member for cooling) 5 were checked visually and ranked with one of five grades, respectively.

The criterion for evaluation for stains on the first cooling roller:

5: During three hours of the casting, stains were not observed

4: During three hours of the casting, stains were slightly observed

3: During one hours of the casting, stains were slightly observed

2: During ten minutes of the casting, stains were observed, and thereafter, the degree of stains became severe with the casting hours.

1: Stains were observed from immediately after the start of the casting, and the degree of stains became severe with the casting hours.

(Evaluation of the Soil of a Film)

Further, stains on the cellulose acetate propionate films produced in each of Examples 1 to 11 and Comparative examples 1 to 3 were checked visually and ranked with one of three grades, respectively.

The criterion for evaluation for stains on the film:

3: During three hours of the casting, stains were not observed

2: During three hours of the casting, stains were slightly partially observed

1: During ten minutes of the casting, stains were observed, and thereafter, the degree of stains became severe with the casting hours.

The obtained results are shown in the following Table 1.

TABLE 1

|  | Temperature of the first rotating member for cooling (° C.) | Ratio of peripheral speed of the third rotating member to the first rotating member (S3/S1) | Line pressure of the second rotating member for pressing (N/mm) | Stain on the first rotating member | Stain on film |
|---|---|---|---|---|---|
| Example 1 | 120 | 1.002 | 5 | 4 | 3 |
| Example 2 | 120 | 1.02 | 5 | 5 | 3 |
| Example 3 | 120 | 1.04 | 5 | 4 | 3 |
| Example 4 | 130 | 1.02 | 0.5 | 4 | 3 |
| Example 5 | 130 | 1.02 | 5 | 5 | 3 |
| Example 6 | 130 | 1.02 | 45 | 4 | 3 |
| Example 7 | 120 | 1.00 | 5 | 3 | 2 |
| Example 8 | 120 | 0.98 | 5 | 3 | 2 |
| Example 9 | 120 | 1.06 | 5 | 3 | 2 |
| Example 10 | 130 | 1.02 | 0.4 | 3 | 2 |

TABLE 1-continued

|  | Temperature of the first rotating member for cooling (° C.) | Ratio of peripheral speed of the third rotating member to the first rotating member (S3/S1) | Line pressure of the second rotating member for pressing (N/mm) | Stain on the first rotating member | Stain on film |
|---|---|---|---|---|---|
| Example 11 | 130 | 1.02 | 55 | 3 | 2 |
| Comparative Example 1 | 100 | 1.00 | 5 | 1 | 1 |
| Comparative Example 2 | 110 | 1.00 | 5 | 1 | 1 |
| Comparative Example 3 | 140 | 1.02 | 5 | 1 | 2 |

As can be seen from the results in the above Table 1, it is understood that according to the optical film producing method of the present invention described in Examples 1 to 11, stains on both the first cooling roller (first rotating member for cooling) 5 and the film were improved as compared with the case of Comparative examples 1 to 3. In Examples 1 to 6 which are included in all of claims 1 to 3, excellent results were obtained especially.

Here, in the above-mentioned Examples 1 to 11, stains on the cooling roller were evaluated with reference to the first cooling roller (first rotating member for cooling) 5. In addition, stains on the second cooling roller (third rotating member for cooling) 7 and stains on the third cooling roller (fourth rotating member for cooling) 8 were also evaluated. As a result, during three hours of the casting, stains were not observed. Accordingly, the same results in the above-mentioned Examples 1 to 11 were obtained.

The invention claimed is:

1. An optical film producing method according to a melt casting film producing method, comprising the steps of:
   extruding a molten material of a resin mixture containing resin and 5% by weight or more of additive agents other than the resin in a form of film from a casting die;
   pressing the extruded film-shaped molten material between a first rotating member for cooling and a second rotating member for pressing so as to cool a film of the molten material; and
   conveying the cooled film by a third rotating member for cooling;
   wherein the additive agents include a plasticizer and an ultraviolet absorber, and each of the plasticizer and the ultraviolet absorber has a melting point lower than a glass transition temperature (Tg) of the resin mixture, and
   wherein a temperature of the first rotating member for cooling is made equal to or less than the glass transition temperature (Tg) of the resin mixture and equal to or more than the melting point of each of the plasticizer and the ultraviolet absorber.

2. The optical film producing method described in claim 1, wherein a ratio ($S_3/S_1$) of a peripheral speed ($S_3$) of the third rotating member for cooling to a peripheral speed ($S_1$) of the first rotating member for cooling is 1.001 to 1.05.

3. The optical film producing method described in claim 1, wherein the film-shaped molten material is pressed onto the first rotating member for cooling with a line pressure of 0.5 to 50 N/mm by the second rotating member for pressing.

4. The optical film producing method described in claim 1, wherein the additive agents are contained in an amount of 5% by weight to 20% by weight in the resin mixtures.

* * * * *